US012043048B2

(12) United States Patent
Robles Flores et al.

(10) Patent No.: US 12,043,048 B2
(45) Date of Patent: Jul. 23, 2024

(54) METHOD AND APPARATUS FOR PRINTING ON MEDIA FULL BLEED

(71) Applicant: Xerox Corporation, Norwalk, CT (US)

(72) Inventors: Eliud Robles Flores, Rochester, NY (US); William G. Osbourne, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 567 days.

(21) Appl. No.: 16/180,813

(22) Filed: Nov. 5, 2018

(65) Prior Publication Data

US 2020/0139739 A1 May 7, 2020

(51) Int. Cl.
*B41M 5/00* (2006.01)
*B41M 5/50* (2006.01)

(52) U.S. Cl.
CPC .......... *B41M 5/0017* (2013.01); *B41M 5/502* (2013.01)

(58) Field of Classification Search
CPC .. B65D 27/00; B65D 5/4216; B65D 73/0007; B41M 5/0017; B41M 5/502
USPC ........................................................ 101/407.1
See application file for complete search history.

(56) References Cited

U.S. PATENT DOCUMENTS

| | | | | |
|---|---|---|---|---|
| 2,181,252 A * | 11/1939 | Vogel | B65D 27/16 | 229/80 |
| 4,790,475 A * | 12/1988 | Griffin | B41J 13/24 | 229/69 |
| 5,495,981 A * | 3/1996 | Warther | G07B 17/00508 | 229/71 |
| 5,519,481 A | 5/1996 | Kuo | | |
| 5,579,908 A * | 12/1996 | Johnson | B65D 75/14 | 206/308.3 |
| 5,848,347 A | 12/1998 | Kuo et al. | | |
| 6,002,913 A | 12/1999 | Pawlik et al. | | |
| 6,079,189 A * | 6/2000 | Sloot | B65B 11/50 | 493/90 |
| 7,424,246 B2 | 9/2008 | Spence et al. | | |
| 7,437,120 B2 | 10/2008 | Ruthenberg et al. | | |
| 7,809,323 B2 | 10/2010 | Johnston et al. | | |
| 8,322,061 B1 * | 12/2012 | Kraft | G09F 3/0289 | 40/638 |
| 8,651,375 B1 * | 2/2014 | Gouldd | G06Q 30/0214 | 235/487 |
| 9,710,203 B2 | 7/2017 | Van Acquoij | | |
| 2004/0033326 A1 * | 2/2004 | Tataryan | B42D 5/027 | 428/40.1 |
| 2004/0069661 A1 * | 4/2004 | Telleen | G06Q 30/0273 | 206/37.1 |

(Continued)

OTHER PUBLICATIONS

U.S. Appl. No. 16/180,713, filed Nov. 5, 2018.
U.S. Appl. No. 16/180,762, filed Nov. 5, 2018.

*Primary Examiner* — Jennifer Bahls
*Assistant Examiner* — Quang X Nguyen
(74) *Attorney, Agent, or Firm* — Simpson & Simpson, PLLC

(57) ABSTRACT

A printable media including a carrier layer, a first envelope and a first adhesive. The carrier layer includes a first surface having a first area and a second surface opposite the first surface. The first envelope includes a third surface, a fourth surface opposite the third surface, and a second area less than the first area. The first envelope is secured to the carrier layer by the first adhesive bonding the fourth surface to the first surface.

27 Claims, 24 Drawing Sheets

(56) References Cited

U.S. PATENT DOCUMENTS

| | | | | |
|---|---|---|---|---|
| 2004/0264813 | A1* | 12/2004 | Steffens | B65D 27/30 383/5 |
| 2007/0017973 | A1* | 1/2007 | Blank | B65D 27/00 235/487 |
| 2010/0044419 | A1* | 2/2010 | Brill | B65D 73/0078 229/68.1 |
| 2014/0054187 | A1* | 2/2014 | Glass | A45C 11/182 206/307 |
| 2016/0083127 | A1* | 3/2016 | Tillstrom | B65B 5/028 53/410 |
| 2016/0103633 | A1 | 4/2016 | Huijbers et al. | |
| 2017/0225498 | A1 | 8/2017 | Van Acquoij et al. | |

* cited by examiner

METHOD AND APPARATUS FOR PRINTING ON MEDIA FULL BLEED

TECHNICAL FIELD

The presently disclosed embodiments are directed to providing a printable media, including but not limited to a printable media having a malleable layer, and even more particularly to a printable media including a supporting carrier layer and printable media attached thereto, e.g., a fabric layer, an envelope, etc. Additionally, the presently disclosed embodiments are directed to methods of forming an image using the foregoing printable media.

BACKGROUND

Forming images, e.g., printing, on paper is well known in the art. Offset printing, xerography, ink deposition, etc. have been used for many years to form images and text on paper media. However, as time has advanced, the desire to print on substrates other than traditional paper media has become increasingly of interest. While forming images on paper is well known and reasonably predictable, forming images on various other substrates and various configurations of paper media have been difficult to accomplish and results can vary dramatically. For example, xerographic printing on card stock can produce high image quality having durability if fusing is properly performed, or may result in an image that rubs off of the card stock if fusing is inadequate. Similarly, forming an image on paper media that comprises one or more folded surfaces, e.g., an envelope, is difficult to accomplish. In like fashion, forming images on less common materials such as fabrics, tissue paper, and other malleable materials, using traditional image forming techniques has been difficult, inconsistent and limited in application. Thus, known systems that form images on fabrics and malleable materials are slow and lack high image quality.

Moreover, known systems that traditionally form images on paper substrates are limited in the size of the paper substrate that can be used, e.g., 11"×17". Even new systems such as the systems described in the concurrently filed application entitled "SYSTEM, APPARATUS, AND METHOD FOR PRINTING LARGE FORMAT MEDIA AND TARGETED DECURLING OF VARIOUS PRINTING PROCESSES" dramatically improve the capabilities of known printing systems, however are limited to media lengths similar to the distance between the image formation zone and fuser/dryer, and are limited to widths similar to the fixed width print heads or cross process movement of print heads. Increasing the size, i.e., length and/or width, of a printed article has always been a difficult task. The primary reason for this issue is that printer hardware is designed for certain dimensions, and hardware flexibility and extensibility are difficult to plan for without increased costs and complexity. It should be appreciated that the systems and methods described in the concurrently filed application entitled "PRINTABLE MEDIA AND METHODS FOR FORMING AN IMAGE ON THE SAME" overcome the foregoing media size limitations by providing means to double either the process direction or cross process direction media length limitation.

Still further, conventional printing system arrangements are not configured to print full bleed. It should be appreciated that as used herein "full bleed" is intended to mean printing at least a portion of a print media entirely to at least one edge, and may also include printing a portion of a print media entirely to more than one edge, e.g., printing an entire surface of a print media thereby leaving no border at any edge. Conventional printing systems and print media require a border or edge that remains unprinted and later removed, e.g., trimmed, in order to result in an image that is printed full bleed on that media. Such full bleed printing is particularly difficult on less conventional media, e.g., fabric, tissue paper, envelopes, etc.

The present disclosure addresses a printable media and method for forming a full bleed image on the same that overcomes the foregoing shortcomings.

SUMMARY

According to aspects illustrated herein, there is provided a printable media including a carrier layer, a first envelope and a first adhesive. The carrier layer includes a first surface having a first area and a second surface opposite the first surface. The first envelope includes a third surface, a fourth surface opposite the third surface, and a second area less than the first area. The first envelope is secured to the carrier layer by the first adhesive bonding the fourth surface to the first surface.

According to aspects illustrated herein, there is provided a printable media including a carrier layer and a first envelope. The carrier layer includes a first surface, a second surface opposite the first surface, and a first slot therethrough. The first envelope includes a first closure and a first area. The first envelope is secured to the carrier layer by passing the first closure through the first slot such that the first closure is adjacent the second surface, and the first area is less than a total area of the first surface.

According to aspects illustrated herein, there is provided a printable media including a carrier layer, a first adhesive and a liner layer. The carrier layer includes a first surface having a first area, a second surface opposite the first surface, and a first rigidity. The first adhesive is deposited on the first area. The liner layer includes a first score line arranged to separate the liner layer into a first portion and a second portion. The liner layer is releasably secured to the carrier layer by the first adhesive. A malleable material including a third surface, a fourth surface opposite the third surface, and a second rigidity less than the first rigidity is secured to the carrier layer by the first adhesive bonding the fourth surface to the first surface after removal of at least one of the first portion and the second portion of the liner layer.

According to other aspects illustrated herein, there is provided a method for providing a method of printing a full bleed envelope including: releasably securing a first envelope to a carrier layer with a first adhesive, the carrier layer including a first surface having a first area and a second surface opposite the first surface, the first envelope including a third surface having a first edge, a fourth surface opposite the third surface, and a second area less than the first area, wherein the first envelope is releasably secured to the carrier layer by the first adhesive bonding the fourth surface to the first surface; applying a first dry marking material immediately adjacent to the first edge of the third surface of the first envelope; and, fusing the first dry marking material to the first envelope with a fuser.

According to still other aspects illustrated herein, there is provided a method for providing a method of printing a full bleed envelope including: releasably securing a first envelope to a carrier layer with a first adhesive, the carrier layer including a first surface having a first area and a second surface opposite the first surface, the first envelope including a third surface having a first edge, a fourth surface opposite the third surface, and a second area less than the first area, wherein the first envelope is releasably secured to the carrier layer by the first adhesive bonding the fourth surface to the first surface; applying a first liquid marking material immediately adjacent to the first edge of the third surface of the first envelope; and, drying the first liquid marking material to the first envelope with a dryer.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
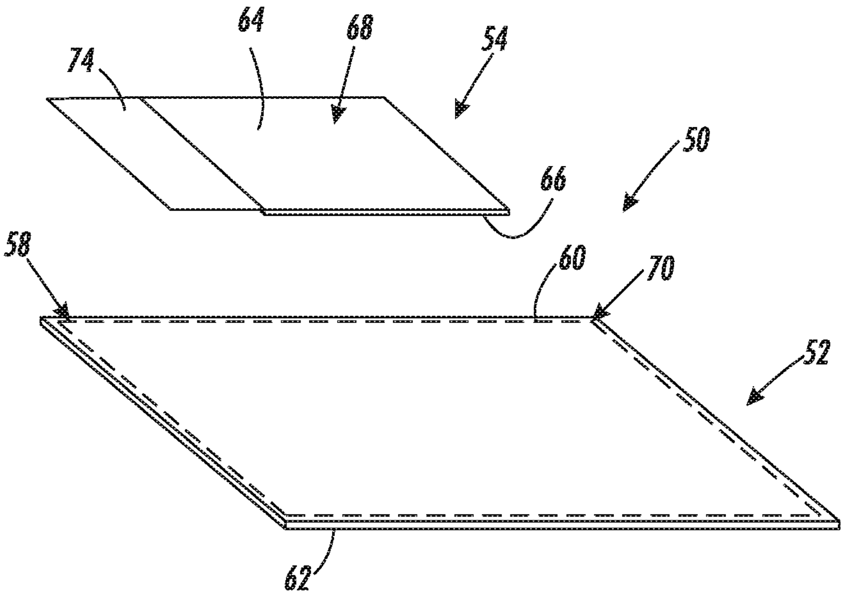
FIG. 1 is a perspective view of an embodiment of a carrier layer and an envelope separated from each other.
Figure 2:
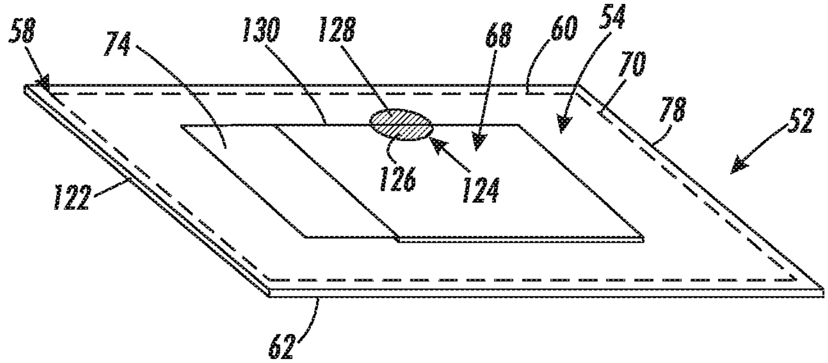
FIG. 2 is a perspective view of an embodiment of a carrier layer with an envelope releasably secured thereto via an adhesive.
Figure 3:
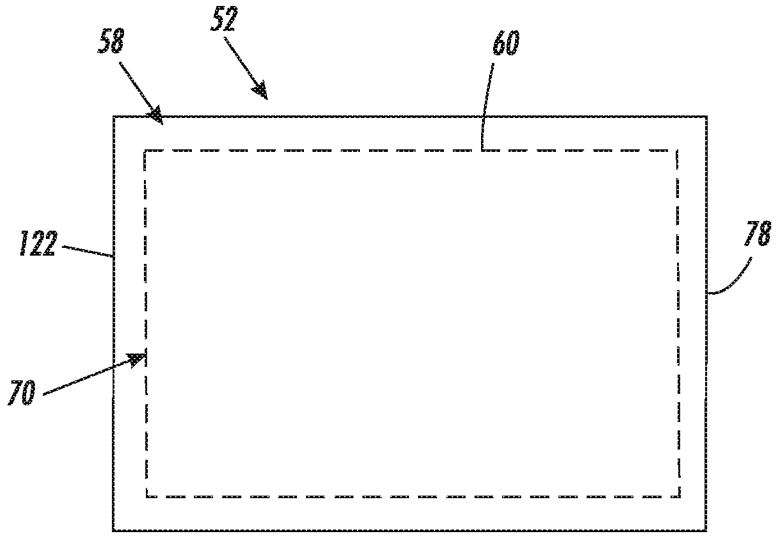
FIG. 3 is a plan view of a first surface of an embodiment of a carrier layer.
Figure 4:
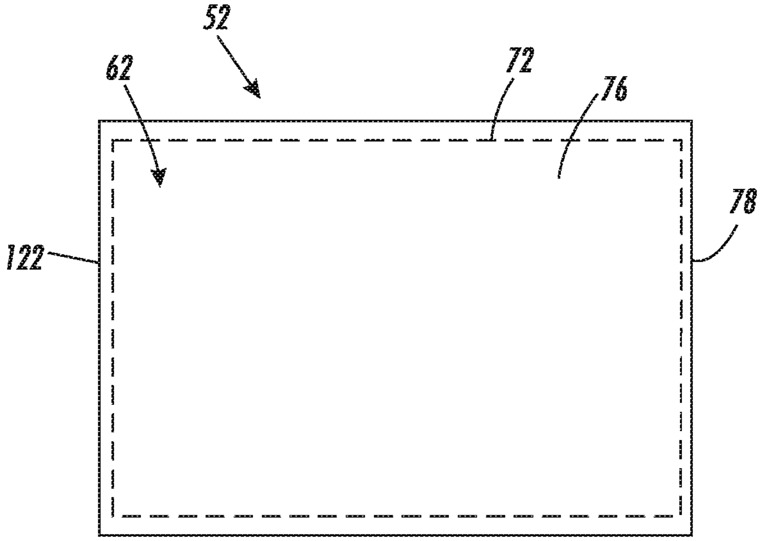
FIG. 4 is a plan view of a second surface of an embodiment of a carrier layer, arranged opposite the first surface depicted in FIG. 3.

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

"Process direction", as used herein, is intended to mean the direction print media travels through the system, while "cross-process direction" is intended to mean the direction perpendicular to the process direction. As used herein, "full width", e.g., "full width array sensor" and "full width printhead array", is intended to be broadly construed as any structure that covers a significant width of the substrate. A "full width array sensor" comprises at least one linear array of photosensors, arranged perpendicular to the process direction and capable of capturing/recording image data at a size relevant to the control system. For example, in some embodiments, the length of a full width array sensor is approximately half of the width of the substrate which it inspects. Furthermore, the words "printer," "printer system", "printing system", "printer device" and "printing device" as used herein encompasses any apparatus, such as a digital copier, bookmaking machine, facsimile machine, multi-function machine, etc. which performs a print outputting function for any purpose, while "multi-function device" and "MFD" as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions, recording and/or reproducing media or any other type of consumer or non-consumer analog and/or digital electronics. Additionally, as used herein, "sheet," "sheet of paper" and "paper" refer to, for example, paper, transparencies, parchment, film, fabric, plastic, photo-finishing papers or other coated or non-coated substrate media in the form of a web upon which information or markings can be visualized and/or reproduced.

As used herein, "fusing," with respect to dry marking material such as toner, is intended to mean supplying heat energy and/or pressure, having the effect of slightly liquifying the applied dry marking material (toner) particles, in turn causing them to adhere to a surface. "Drying," as used herein, is intended to mean applying energy, typically but not necessarily heat in radiant and/or convective form, having the effect of causing a liquid component of the ink (a liquid marking material) to evaporate. "Curing," as used herein, for example with respect to IR inks (liquid marking material) is intended to mean applying energy, such as by typically but not necessarily infrared waves, having the effect of causing a chemical reaction within at least one component of the applied ink, thereby fixing the ink to a surface. It should be appreciated that in the context of this application and its claims, "drying" is intended to include "curing" as both terms apply to methods of making a liquid marking material a permanent fixed, cured and/or dried material attached to a print media. Thus, all claims reciting the phrase drying a liquid marking material, or phrases similar thereto, necessarily also include curing a liquid marking material.

As used herein, the term 'average' shall be construed broadly to include any calculation in which a result datum or decision is obtained based on a plurality of input data, which can include but is not limited to, weighted averages, yes or no decisions based on rolling inputs, etc. Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

Broadly, in some embodiments, printable media 50 comprises carrier layer 52, envelope 54 and adhesive 56. Carrier layer 52 comprises surface 58 comprising area 60 and surface 62 opposite surface 58. Envelope 54 comprises surface 64, surface 66 opposite surface 64, and area 68 which is less than area 60. Envelope 54 is secured to carrier layer 52 by adhesive 56 bonding surface 66 to surface 58.

In some embodiments, adhesive 56 is deposited area 60. In some embodiments, area 60 is less than or equal to total area 70 of surface 58.

In some embodiments, carrier layer 52 further comprises area 72 on surface 62 and envelope 54 comprises closure 74. Adhesive 56 is deposited on area 60, adhesive 76 is deposited on area 72, and envelope 54 is secured to carrier layer 52 by adhesive 56 bonding surface 66 to surface 58 and adhesive 76 bonding closure 74 to surface 62. It should be appreciated that the foregoing embodiment performs better when closure 74 either passes through carrier layer 52, as described in greater detail below, or passes around lead edge 78.

In some embodiments, printable media 50 further comprises envelope 80. Envelope 80 comprises surface 82, surface 84 (not shown) opposite surface 82, and area 86 which is less than area 60. Envelope 80 is secured to carrier layer 52 by adhesive 56 bonding surface 84 (not shown) to surface 58.

In some embodiments, a combination of area 68 and area 86 is less than area 60. In some embodiments, envelope 54 comprises edge 88, envelope 80 comprises edge 90, and edge 88 contacts edge 90. In some embodiments, edge 88 is adjacent to and separated from edge 90.

In some embodiments, printable media 50 further comprises envelope 92 comprising surface 94, surface 96 opposite surface 94, and area 98 which is less than area 60. Envelope 92 is secured to carrier layer 52 by adhesive 56 bonding surface 96 to surface 58. In some embodiments, a combination of area 68, area 72 and area 98 is less than area 60. In some embodiments, envelope 54 comprises edge 88, envelope 80 comprises edge 90 and edge 100, envelope 92 comprises edge 102, and edge 88 contacts edge 90, and edge 100 contacts edge 102. In some embodiments, edge 88 is adjacent to and separated from edge 90, and edge 100 is adjacent to and separated from edge 102.

In some embodiments, printable media 50 further comprises envelope 104 comprising surface 106, surface 108 opposite surface 106, and area 110 which is less than area 60. Envelope 104 is secured to carrier layer 52 by adhesive 56 bonding surface 108 to surface 58. In some embodiments, a combination of area 68, area 86, area 98, and area 110 is less than area 60.

In some embodiments, envelope 54 comprises edge 88, envelope 80 comprises edge 90 and edge 100, envelope 92 comprises edge 102 and edge 112, envelope 104 comprises edge 114, and edge 88 contacts edge 90, edge 100 contacts edge 102, and edge 112 contacts edge 114. In some embodiments, edge 88 is adjacent to and separated from edge 90, edge 100 is adjacent to and separated from edge 102, and edge 112 is adjacent to and separated from edge 114. In some embodiments, envelope 54 comprises edge 116 and envelope 104 comprises edge 118, and edge 116 contacts edge 118. In some embodiments, edge 116 is adjacent to and separated from edge 118.

In some embodiments, envelope 54 comprises edge 88, envelope 80 comprises edge 90, edge 100, and edge 120, envelope 92 comprises edge 102, and envelope 104 comprises edge 114, and edge 88 contacts edge 90, edge 100 contacts edge 102, and edge 120 contacts edge 114. In some embodiments, edge 88 is adjacent to and separated from edge 90, edge 100 is adjacent to and separated from edge 102, and edge 120 is adjacent to and separated from edge 114.

In some embodiments, carrier layer 52 comprises lead edge 78 and trail edge 122, envelope 54 comprises closure 74, and closure 74 is directionally towards trail edge 122.

It should be appreciated that the foregoing embodiments permit full bleed printing on one or more envelopes. For example, liquid or dry marking material 124 may be deposited on envelope 54 whereby portion 126 of liquid or dry marking material 124 is deposited on envelope 54 while portion 128 of liquid or dry marking material 124 is deposited on carrier layer 52. Upon removal of envelope 54 from carrier layer 52, an image formed by liquid or dry marking material 124 appears printed in full bleed form.

Broadly, in some embodiments, printable media 250 comprises carrier layer 252 and envelope 254. Carrier layer 252 comprises surface 256, surface 258 opposite surface 256, and slot 260. Envelope 254 comprises closure 262 and area 264. Envelope 254 is secured to carrier layer 252 by passing closure 262 through slot 260 such that closure 262 is adjacent surface 258, and area 264 is less than total area 266 of surface 256.

In some embodiments, printable media 250 further comprises envelope 268. Envelope 268 comprises closure 270 and area 272. Carrier layer 252 further comprises slot 274. Envelope 268 is secured to carrier layer 252 by passing closure 270 through slot 274 such that closure 270 is adjacent surface 258. A combination of area 264 and area 272 is less than total area 266 of surface 256.

In some embodiments, envelope 254 comprises edge 276, envelope 268 comprises second edge 278, and edge 276 contacts edge 278. In some embodiments, edge 276 is adjacent to and separated from edge 278.

In some embodiments, printable media 250 further comprises envelope 280. Envelope 280 comprising closure 282 and area 284. Carrier layer 252 further comprises slot 286. Envelope 280 is secured to carrier layer 252 by passing closure 282 through slot 286 such that closure 282 is adjacent surface 258. A combination of area 264, area 272, and area 284 is less than total area 266 of surface 256.

In some embodiments, envelope 254 comprises edge 276, envelope 268 comprises edge 278 and edge 288, envelope 280 comprises edge 290, and edge 276 contacts edge 278, and edge 288 contacts edge 290. In some embodiments, edge 276 is adjacent to and separated from edge 278, and edge 288 is adjacent to and separated from edge 290.

In some embodiments, printable media 250 further comprises envelope 292. Envelope 292 comprises closure 294 and area 296. Carrier layer 252 further comprises slot 298. Envelope 292 is secured to carrier layer 252 by passing closure 294 through slot 298 such that closure 294 is adjacent surface 258. A combination of area 264, area 272, area 284, and area 296 is less than total area 266 of surface 256.

In some embodiments, envelope 254 comprises edge 276, envelope 268 comprises edge 278 and edge 288, envelope 280 comprises edge 290 and edge 300, envelope 292 comprises edge 302, and edge 276 contacts edge 278, edge 288 contacts edge 290, and edge 300 contacts edge 302. In some embodiments, edge 276 is adjacent to and separated from edge 278, edge 288 is adjacent to and separated from edge 290, and edge 300 is adjacent to and separated from edge 302. In some embodiments, envelope 254 comprises edge 304 and envelope 292 comprises edge 306, and edge 302 contacts edge 304. In some embodiments, edge 302 is adjacent to and separated from edge 304.

In some embodiments, envelope 254 comprises edge 276, envelope 268 comprises edge 278, edge 288, and edge 308, envelope 280 comprises edge 300, and envelope 292 comprises edge 302, and edge 276 contacts edge 278, edge 288 contacts edge 290, and edge 308 contacts edge 302. In some embodiments, edge 276 is adjacent to and separated from edge 278, edge 288 is adjacent to and separated from edge 290, and edge 308 is adjacent to and separated from edge 302.

Figure 33:
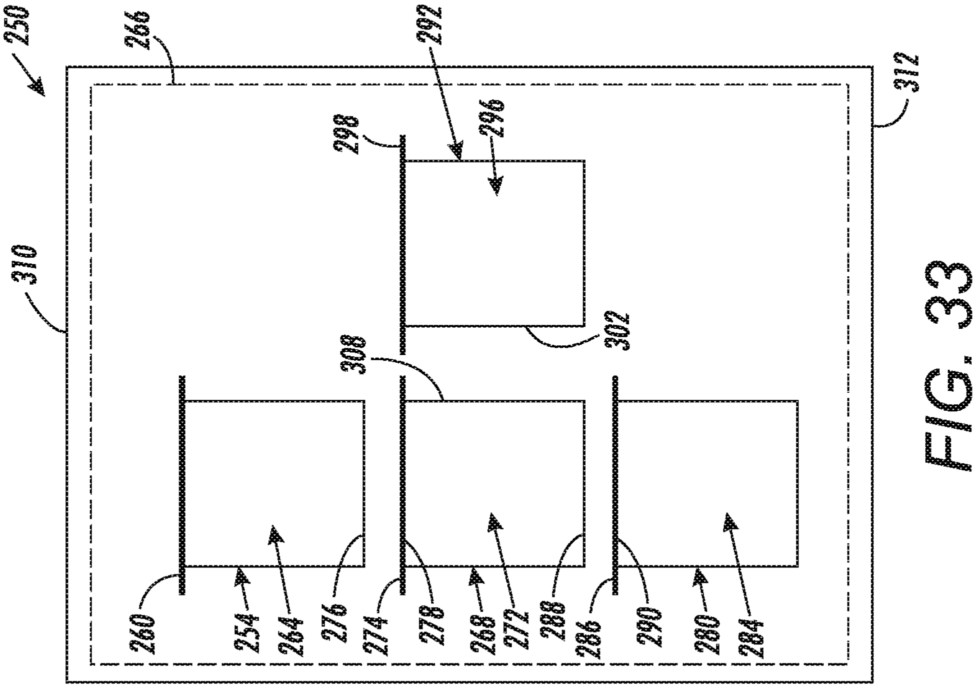
FIG. 33 is a plan view of an embodiment of a present printable media depicting an embodiment of releasably securing four envelopes to a carrier layer via an adhesive.

It should be appreciated that some embodiments may include slots that are combined or formed co-linearly. For example, in the embodiment depicted in FIG. 33, slots 274 and 298 may be a common slot or a continuous slot, or alternatively may be two separately formed slots.

In some embodiments, carrier layer 252 comprises lead edge 310 and trail edge 312, and slot 260, and thereby closure 262, is directionally towards lead edge 310.

It should be appreciated that the foregoing embodiments permit full bleed printing on one or more envelopes. For example, liquid or dry marking material 314 may be deposited on envelope 254 whereby portion 316 of liquid or dry marking material 314 is deposited on envelope 254 while portion 318 of liquid or dry marking material 314 is deposited on carrier layer 252. Upon removal of envelope 254 from carrier layer 252, an image formed by liquid or dry marking material 314 appears printed in full bleed form.

It should be further appreciated that surfaces 256 and 258 may also include an adhesive, e.g., adhesive 320 and 322, respectively. In embodiments including adhesive 320, adhesive 320 releasably secures envelope 254 to surface 256, while in embodiments including adhesive 322, adhesive 322 releasably secures closure 262 to surface 258.

The foregoing embodiments of printable media permit printing envelopes on the same printer and with the same image quality as a card insert. Moreover, an envelope and a card insert may be printed simultaneously as both portions can be included in the presently disclosed print media. For example, printable media 50 may include both envelope 54 and card 132 secured within area 60 via adhesive 56. Alternatively, printable media 50 may comprise carrier layer 132 which comprises area 60, having adhesive 56 deposited thereon, and integrally formed card 132. It should be appreciated that "integrally formed" is intended to mean a card which is formed from the same material as carrier layer 134, which card is defined by edge 136 of partially weakened material, e.g., a perforated edge. Hence, after printing the desired image on envelope 54 and card 132, card 132 may be removed from carrier layer 134 and subsequently inserted in envelope 54. Similarly, printable media 250 may include both envelope 254 and card 326 secured within area 266 via slots 260 and 274, respectively, and in some embodiments using adhesive 256 and/or adhesive 258. Alternatively, printable media 250 may comprise carrier layer 328 which comprises area 330, in some embodiments having adhesive 256 deposited thereon, and integrally formed card 326. It should be appreciated that "integrally formed" is intended to mean a card which is formed from the same material as carrier layer 328, which card is defined by edge 332 of partially weakened material, e.g., a perforated edge. Hence, after printing the desired image on envelope 254 and card 326, card 326 may be removed from carrier layer 328 and subsequently inserted in envelope 254.

Figure 5:
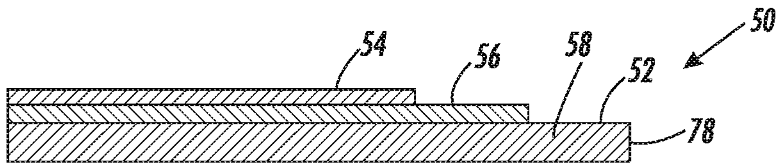
FIG. 5 is a cross sectional view of an embodiment of a present printable media depicting an envelope releasably secured to a carrier layer via an adhesive.
Figure 6:
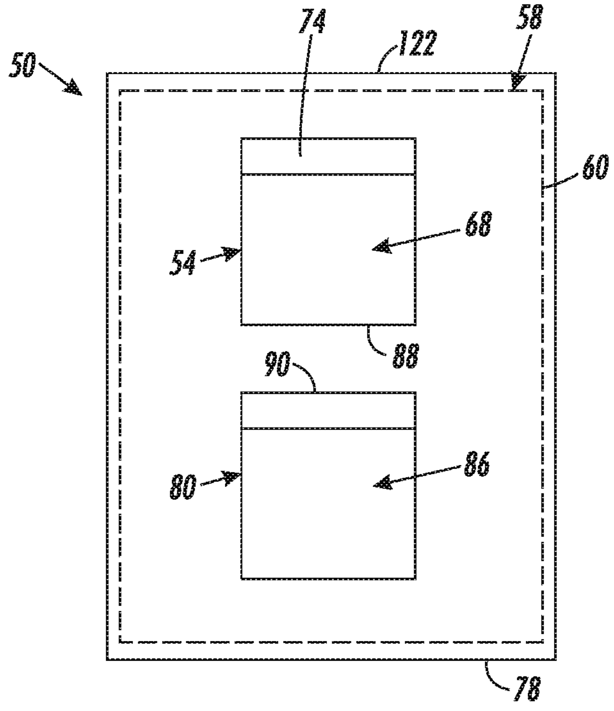
FIG. 6 is a plan view of an embodiment of a present printable media depicting an embodiment of releasably securing two envelopes to a carrier layer via an adhesive.
Figure 7:
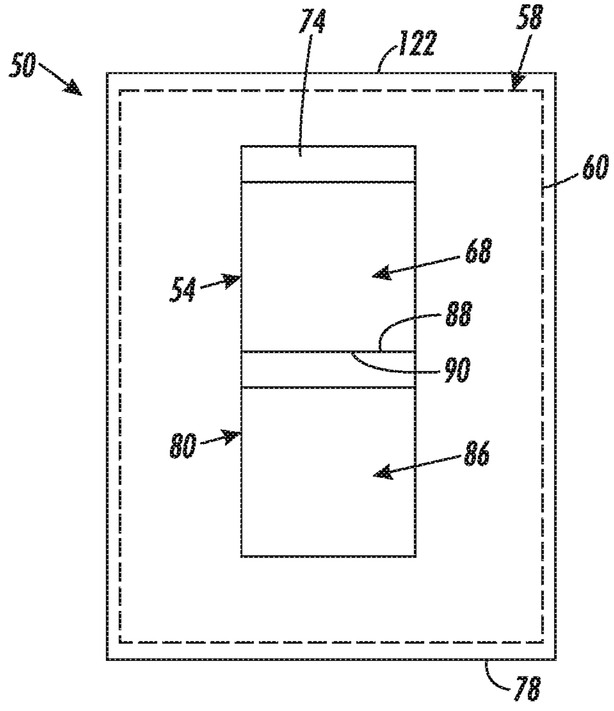
FIG. 7 is a plan view of an embodiment of a present printable media depicting an embodiment of releasably securing two envelopes to a carrier layer via an adhesive.
Figure 8:
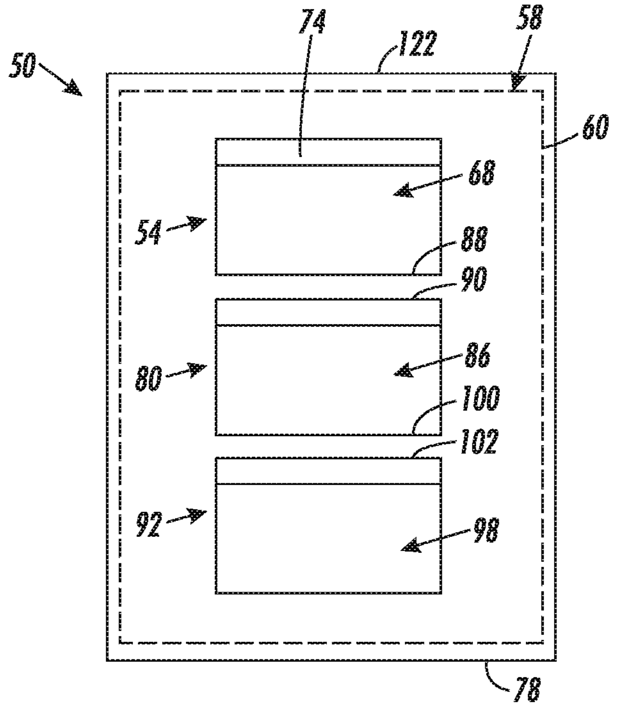
FIG. 8 is a plan view of an embodiment of a present printable media depicting an embodiment of releasably securing three envelopes to a carrier layer via an adhesive.
Figure 9:
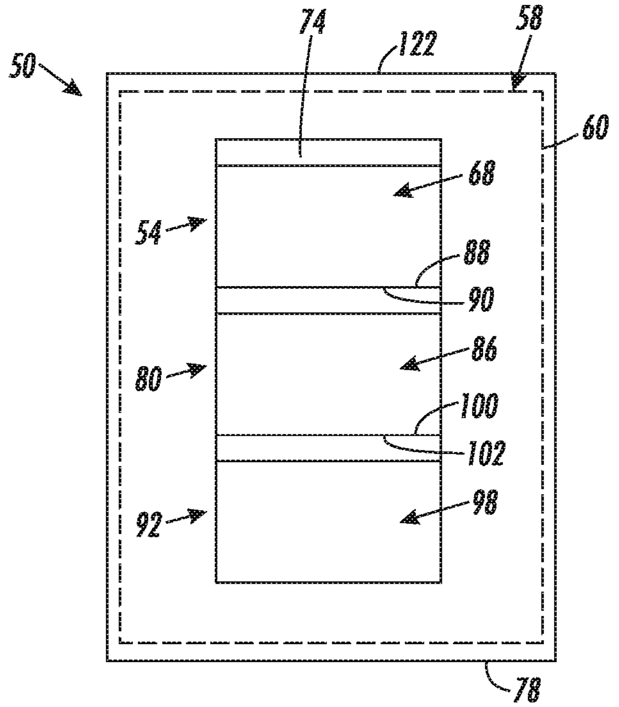
FIG. 9 is a plan view of an embodiment of a present printable media depicting an embodiment of releasably securing three envelopes to a carrier layer via an adhesive.
Figure 10:
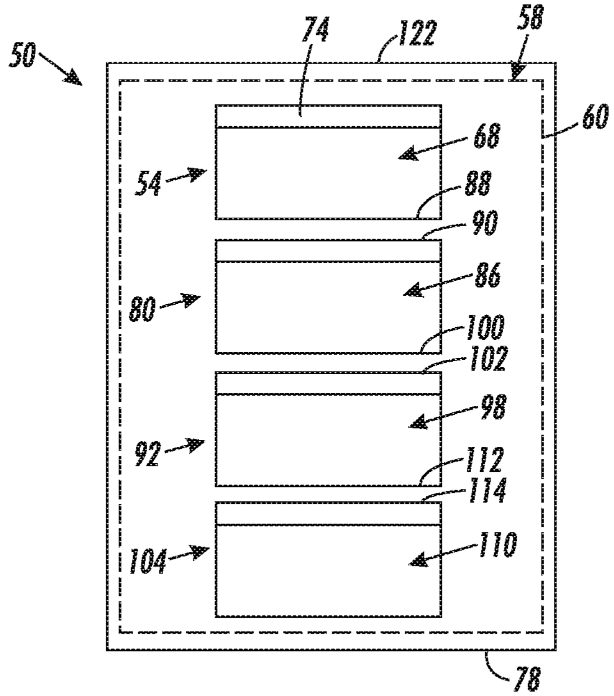
FIG. 10 is a plan view of an embodiment of a present printable media depicting an embodiment of releasably securing four envelopes to a carrier layer via an adhesive.
Figure 11:
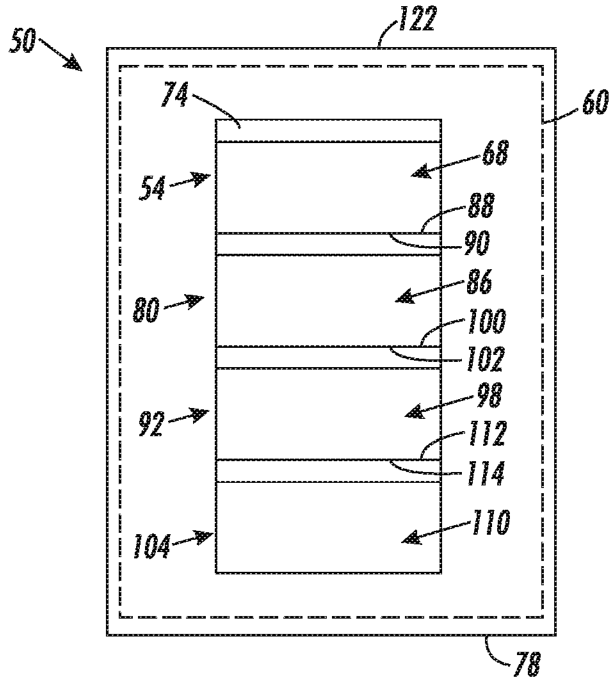
FIG. 11 is a plan view of an embodiment of a present printable media depicting an embodiment of releasably securing four envelopes to a carrier layer via an adhesive.
Figure 12:
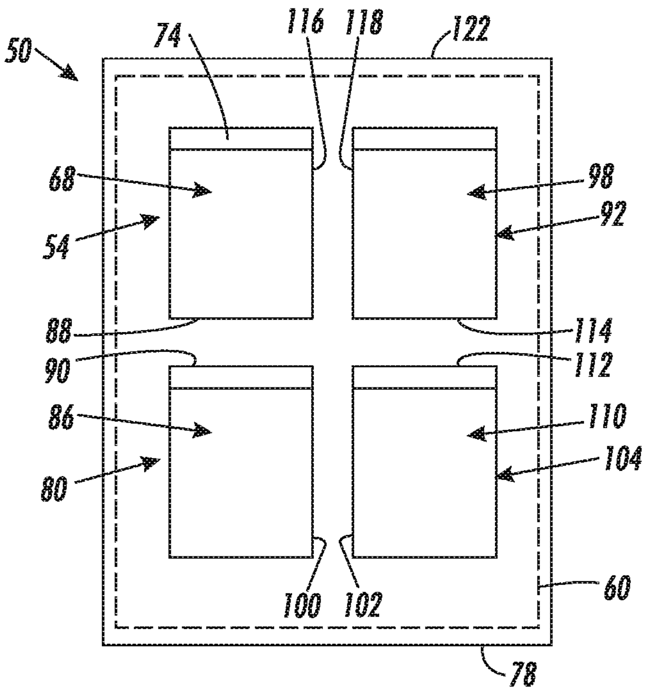
FIG. 12 is a plan view of an embodiment of a present printable media depicting an embodiment of releasably securing four envelopes to a carrier layer via an adhesive.
Figure 13:
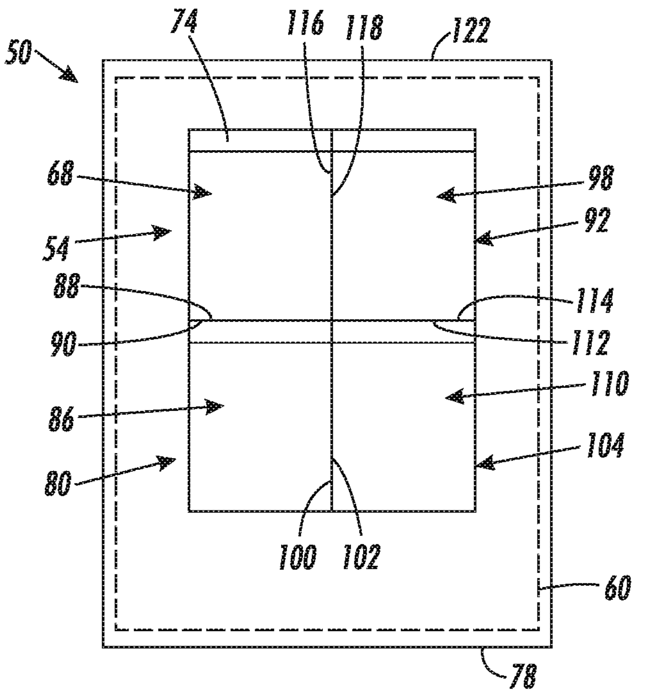
FIG. 13 is a plan view of an embodiment of a present printable media depicting an embodiment of releasably securing four envelopes to a carrier layer via an adhesive.
Figure 15:
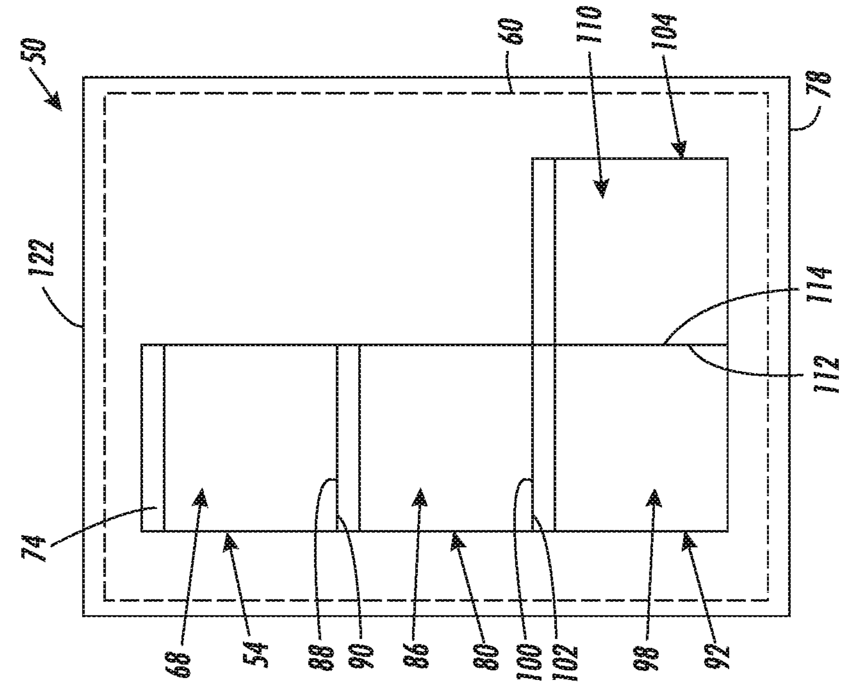
FIG. 15 is a plan view of an embodiment of a present printable media depicting an embodiment of releasably securing four envelopes to a carrier layer via an adhesive.
Figure 14:
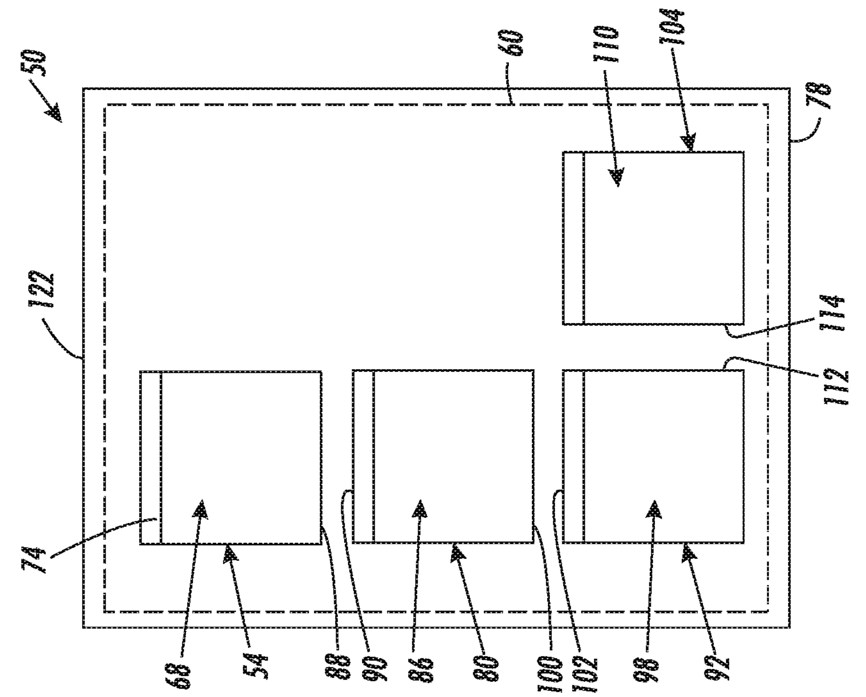
FIG. 14 is a plan view of an embodiment of a present printable media depicting an embodiment of releasably securing four envelopes to a carrier layer via an adhesive.
Figure 17:
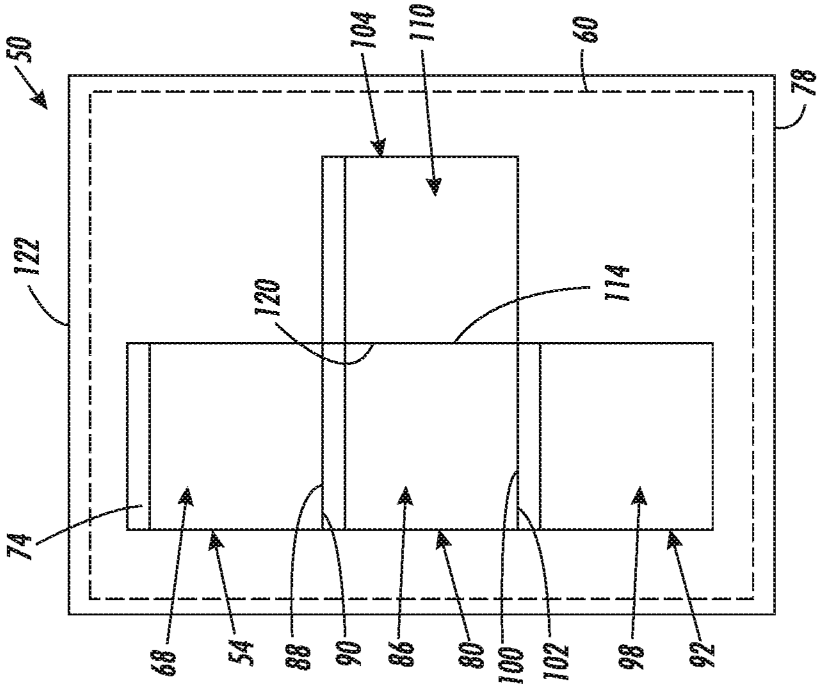
FIG. 17 is a plan view of an embodiment of a present printable media depicting an embodiment of releasably securing four envelopes to a carrier layer via an adhesive.
Figure 16:
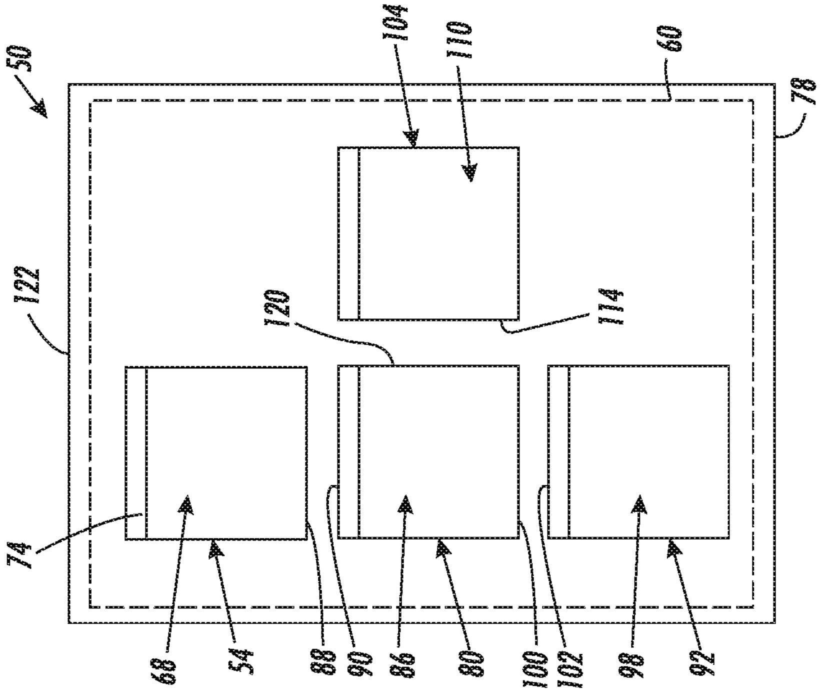
FIG. 16 is a plan view of an embodiment of a present printable media depicting an embodiment of releasably securing four envelopes to a carrier layer via an adhesive.
Figure 18:
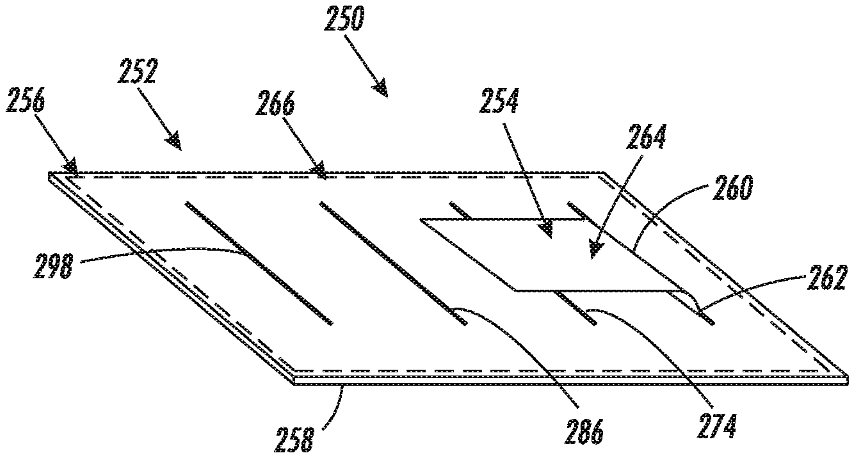
FIG. 18 is a perspective view of an embodiment of a carrier layer and an envelope separated from each other.
Figure 19:
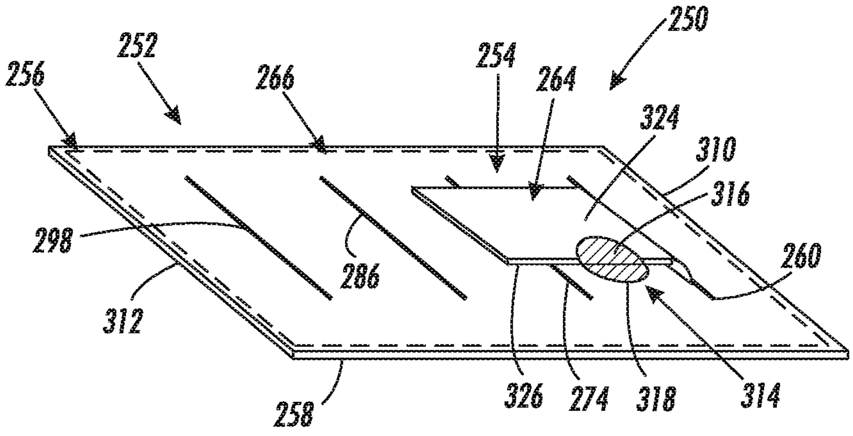
FIG. 19 is a perspective view of an embodiment of a carrier layer with an envelope releasably secured thereto via a slot in the carrier layer.
Figure 20:
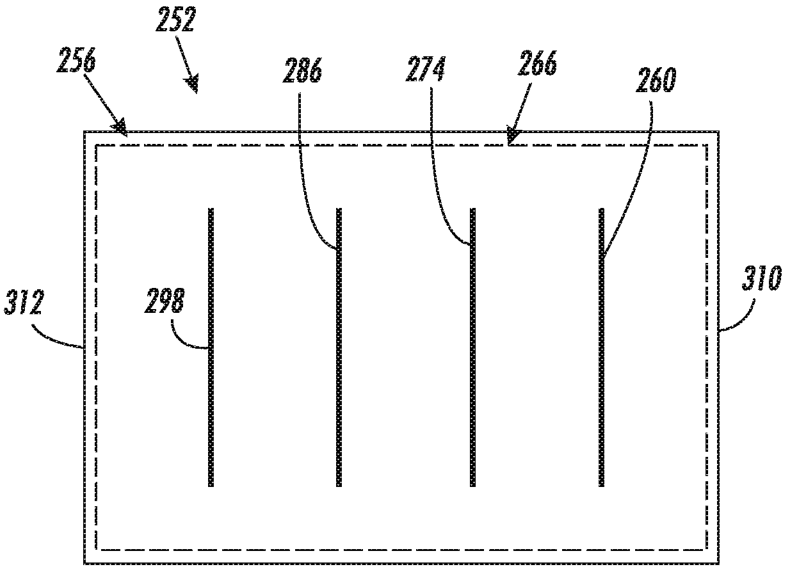
FIG. 20 is a plan view of a first surface of an embodiment of a carrier layer.
Figure 21:
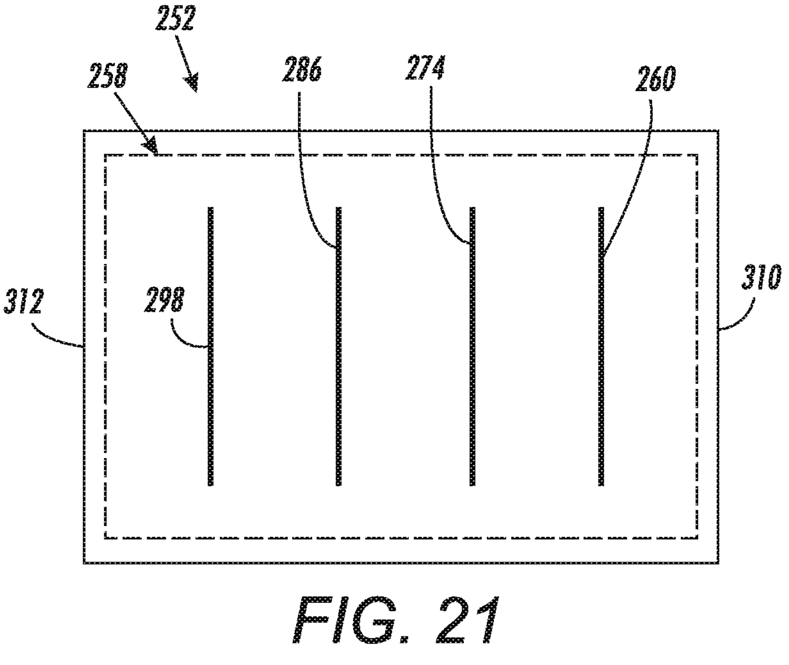
FIG. 21 is a plan view of a second surface of an embodiment of a carrier layer, arranged opposite the first surface depicted in FIG. 20.
Figure 22:
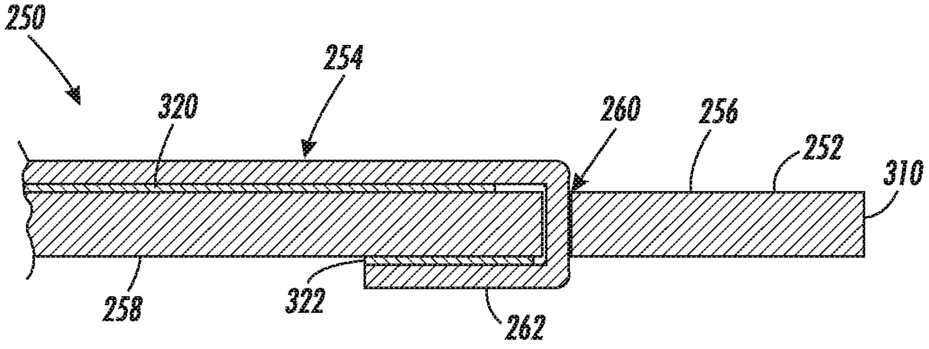
FIG. 22 is a cross sectional view of an embodiment of a present printable media depicting an envelope releasably secured to a carrier layer via passing a closure on the envelope through a slot in the carrier layer.
Figure 24:
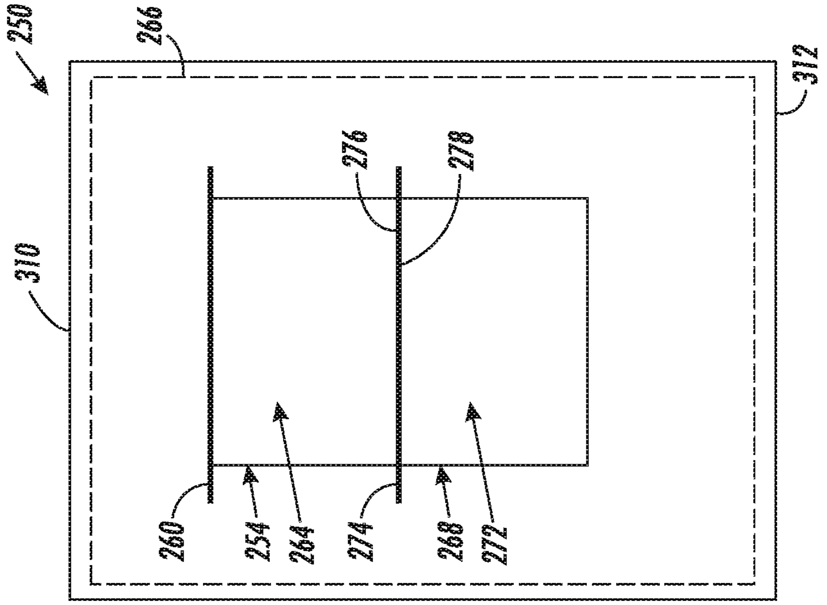
FIG. 24 is a plan view of an embodiment of a present printable media depicting an embodiment of releasably securing two envelopes to a carrier layer via an adhesive.
Figure 23:
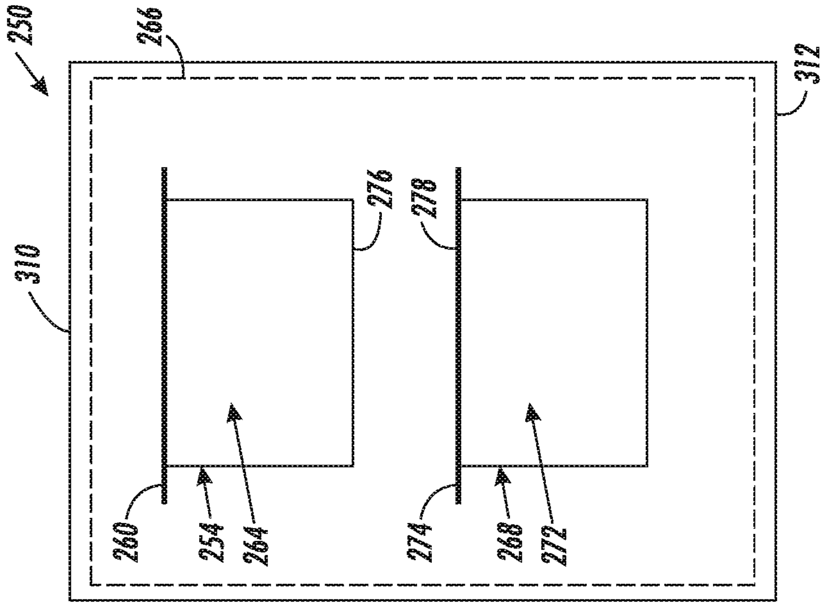
FIG. 23 is a plan view of an embodiment of a present printable media depicting an embodiment of releasably securing two envelopes to a carrier layer via an adhesive.
Figure 26:
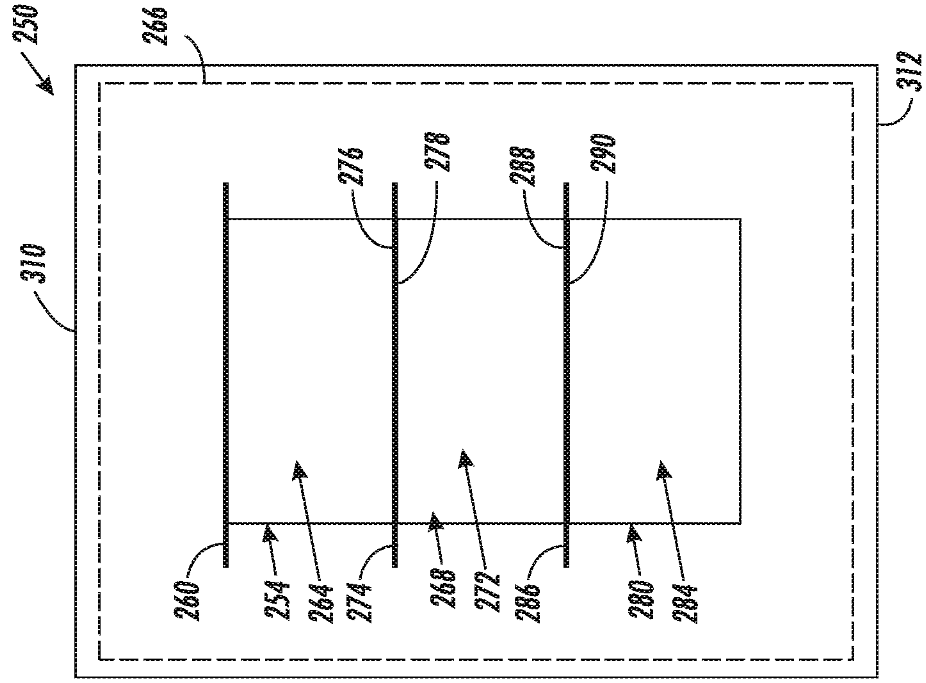
FIG. 26 is a plan view of an embodiment of a present printable media depicting an embodiment of releasably securing three envelopes to a carrier layer via an adhesive.
Figure 25:
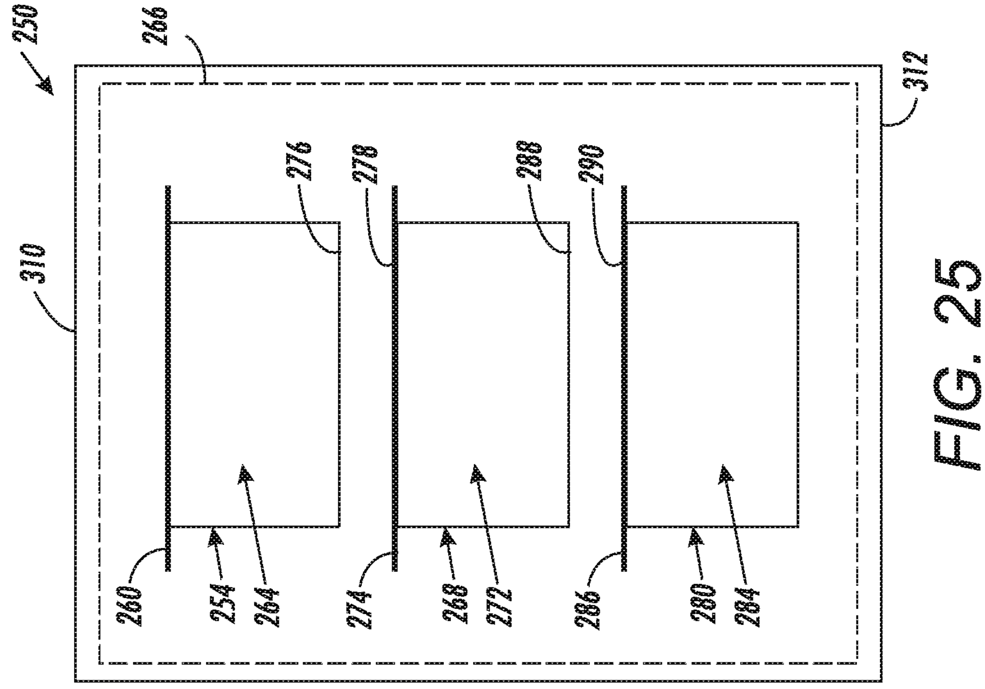
FIG. 25 is a plan view of an embodiment of a present printable media depicting an embodiment of releasably securing three envelopes to a carrier layer via an adhesive.
Figure 28:
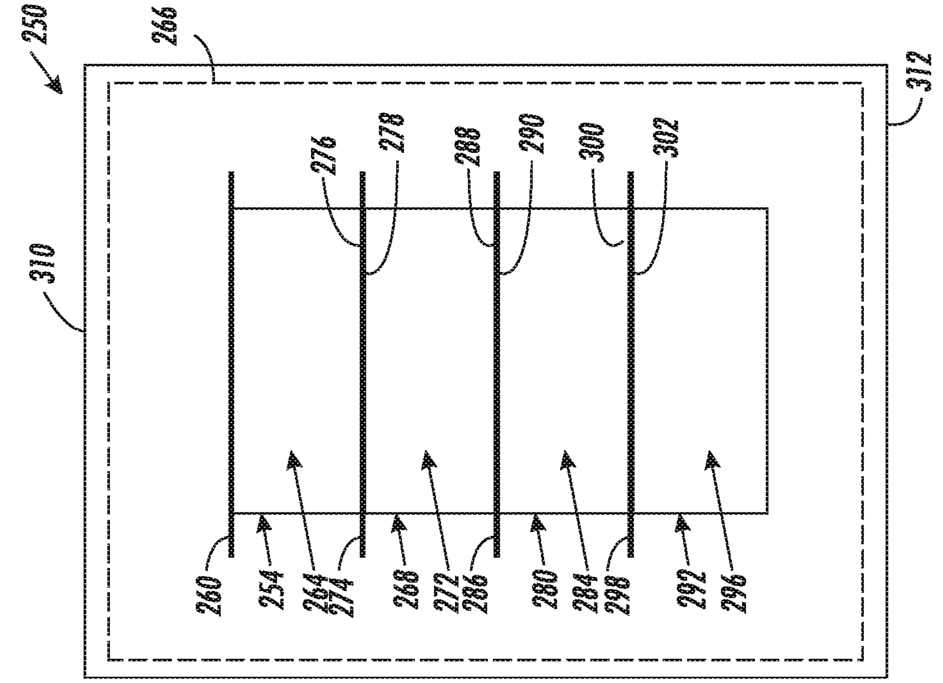
FIG. 28 is a plan view of an embodiment of a present printable media depicting an embodiment of releasably securing four envelopes to a carrier layer via an adhesive.
Figure 27:
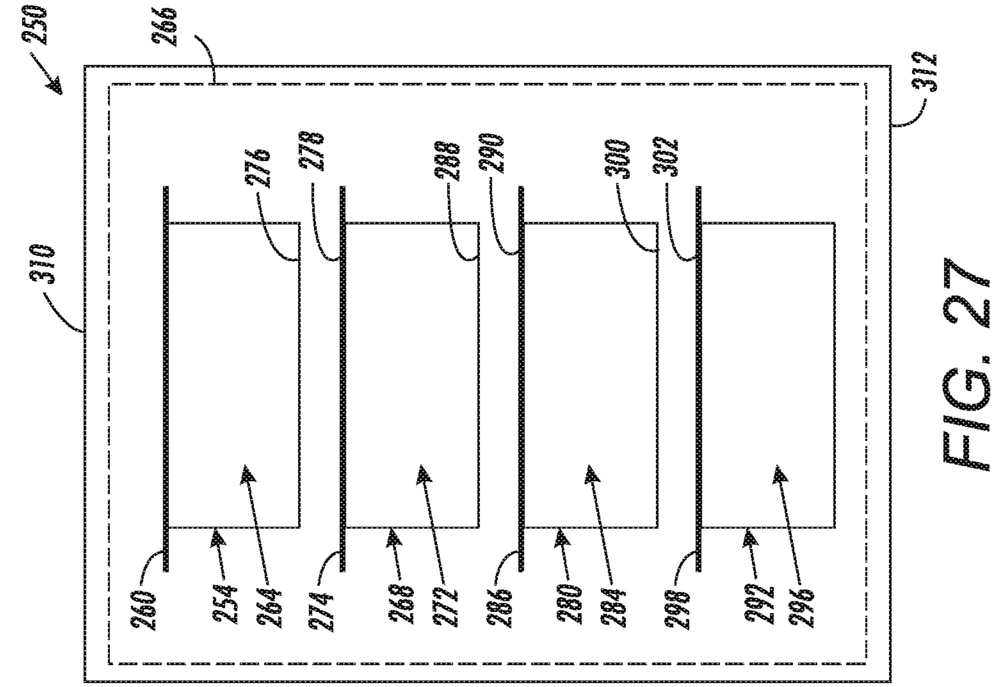
FIG. 27 is a plan view of an embodiment of a present printable media depicting an embodiment of releasably securing four envelopes to a carrier layer via an adhesive.
Figure 30:
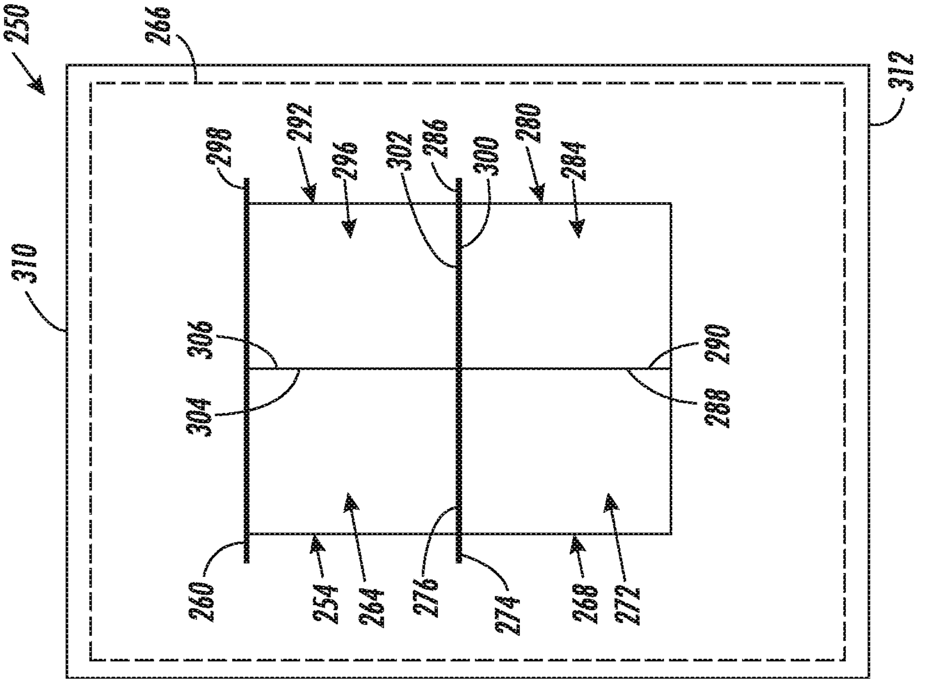
FIG. 30 is a plan view of an embodiment of a present printable media depicting an embodiment of releasably securing four envelopes to a carrier layer via an adhesive.
Figure 29:
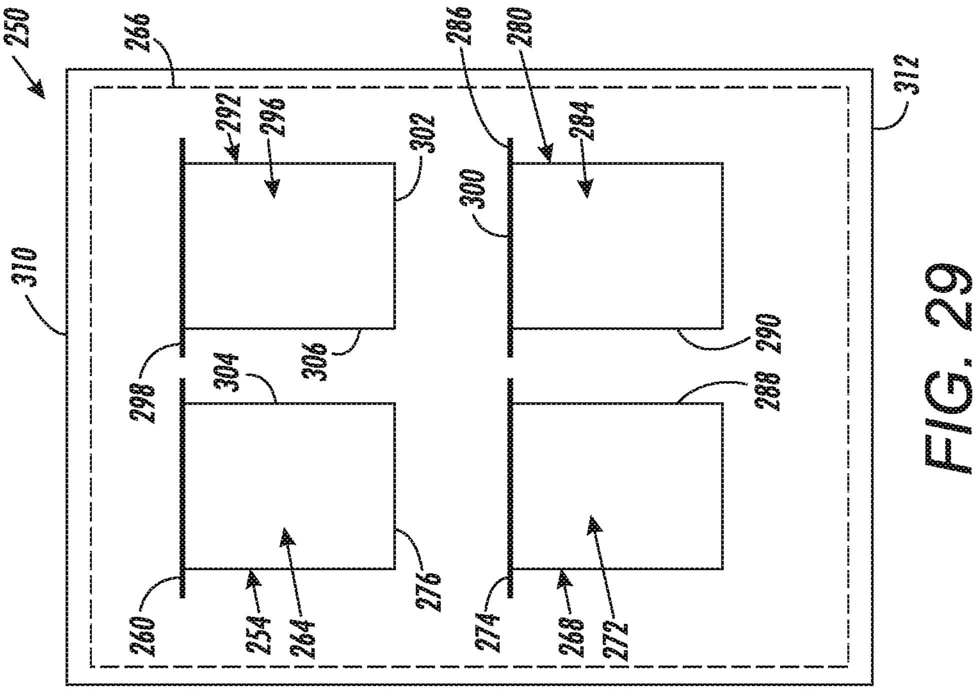
FIG. 29 is a plan view of an embodiment of a present printable media depicting an embodiment of releasably securing four envelopes to a carrier layer via an adhesive.
Figure 32:
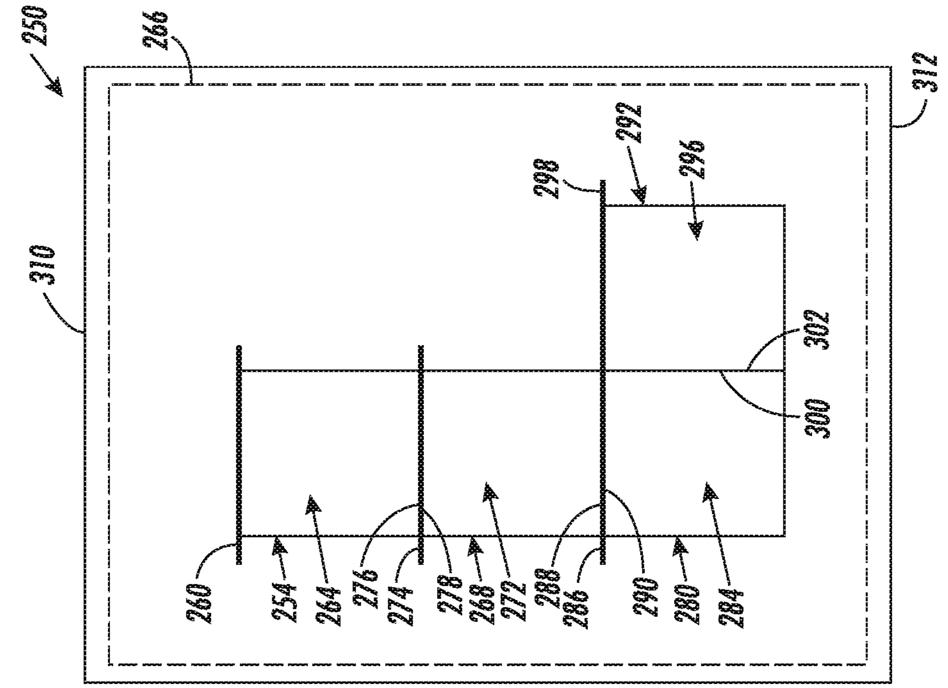
FIG. 32 is a plan view of an embodiment of a present printable media depicting an embodiment of releasably securing four envelopes to a carrier layer via an adhesive.
Figure 31:
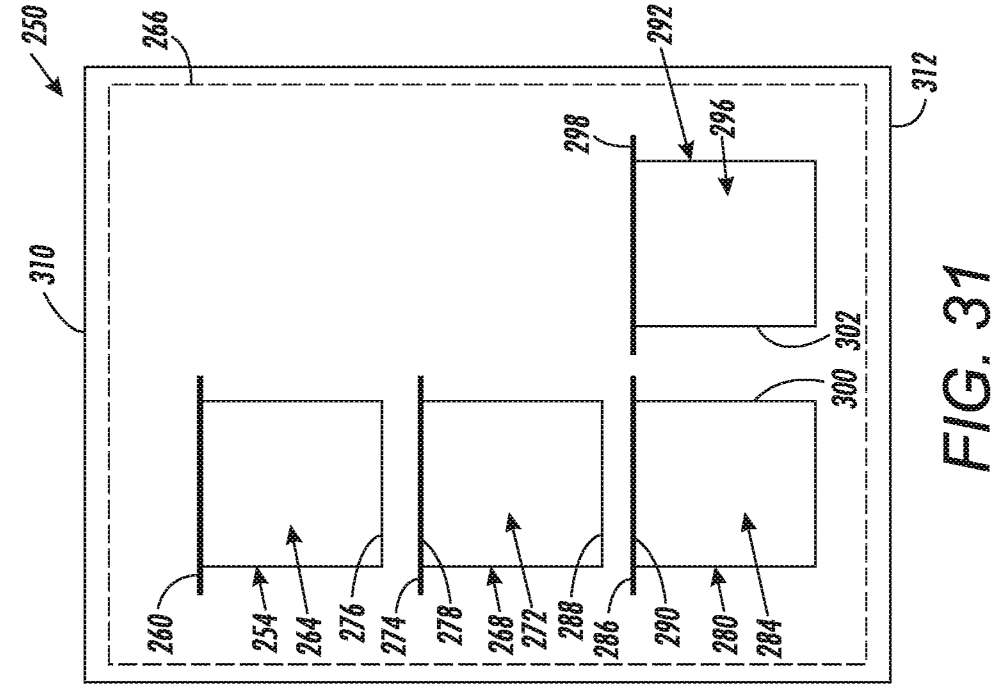
FIG. 31 is a plan view of an embodiment of a present printable media depicting an embodiment of releasably securing four envelopes to a carrier layer via an adhesive.
Figure 34:
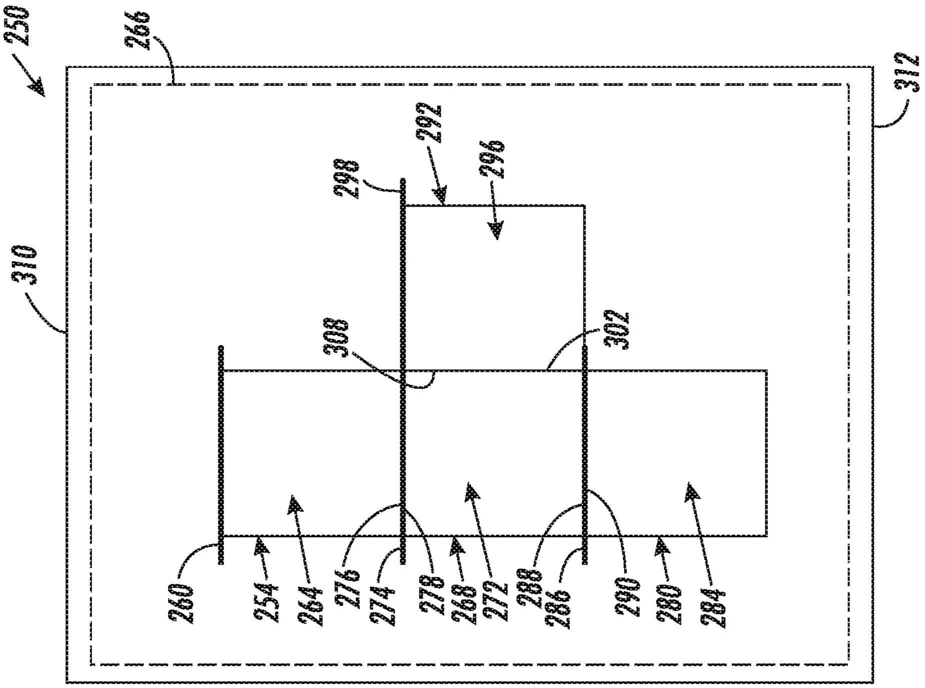
FIG. 34 is a plan view of an embodiment of a present printable media depicting an embodiment of releasably securing four envelopes to a carrier layer via an adhesive.

In some embodiments, printable media 450 comprises carrier layer 452, adhesive 454 and liner layer 456. Carrier layer 452 comprises surface 458 comprising area 460, surface 462 opposite surface 458, and a first rigidity. Adhesive 454 is deposited on area 460. Liner layer 456 comprises score line 464 arranged to separate liner layer 456 into portion 466 and portion 468. Liner layer 456 is releasably secured to carrier layer 452 by adhesive 454. It should be appreciated that adhesive 454 releasably secures liner layer 456 to carrier layer 452 similarly as adhesive 56 releasably secures envelope 54 to carrier layer 52 (See FIG. 5). Malleable material 470 comprises surface 472, surface 474 opposite surface 472, and a second rigidity less than the first rigidity. Malleable material 470 is secured to carrier layer 452 by adhesive 454 bonding surface 474 to surface 458 after removal of at least one of portion 466 and portion 468 of liner layer 456.

In some embodiments, liner layer 456 comprises a plurality of score lines 464 arranged to separate liner layer 456 into a plurality of portions, e.g., portions 476, 478, 480, 482 and 484.

In some embodiments, a first quantity of the plurality of portions is removed from carrier layer 452 prior to adhering malleable material 470 to carrier layer 452. The first quantity of the plurality of portions is in registered alignment with at least one edge of malleable material 470, e.g., edge 486. In some embodiments, the first quantity of the plurality of portions is in registered alignment with at least one edge of malleable material 470, e.g., edge 486, and with a portion of fourth surface 474.

Figure 35:
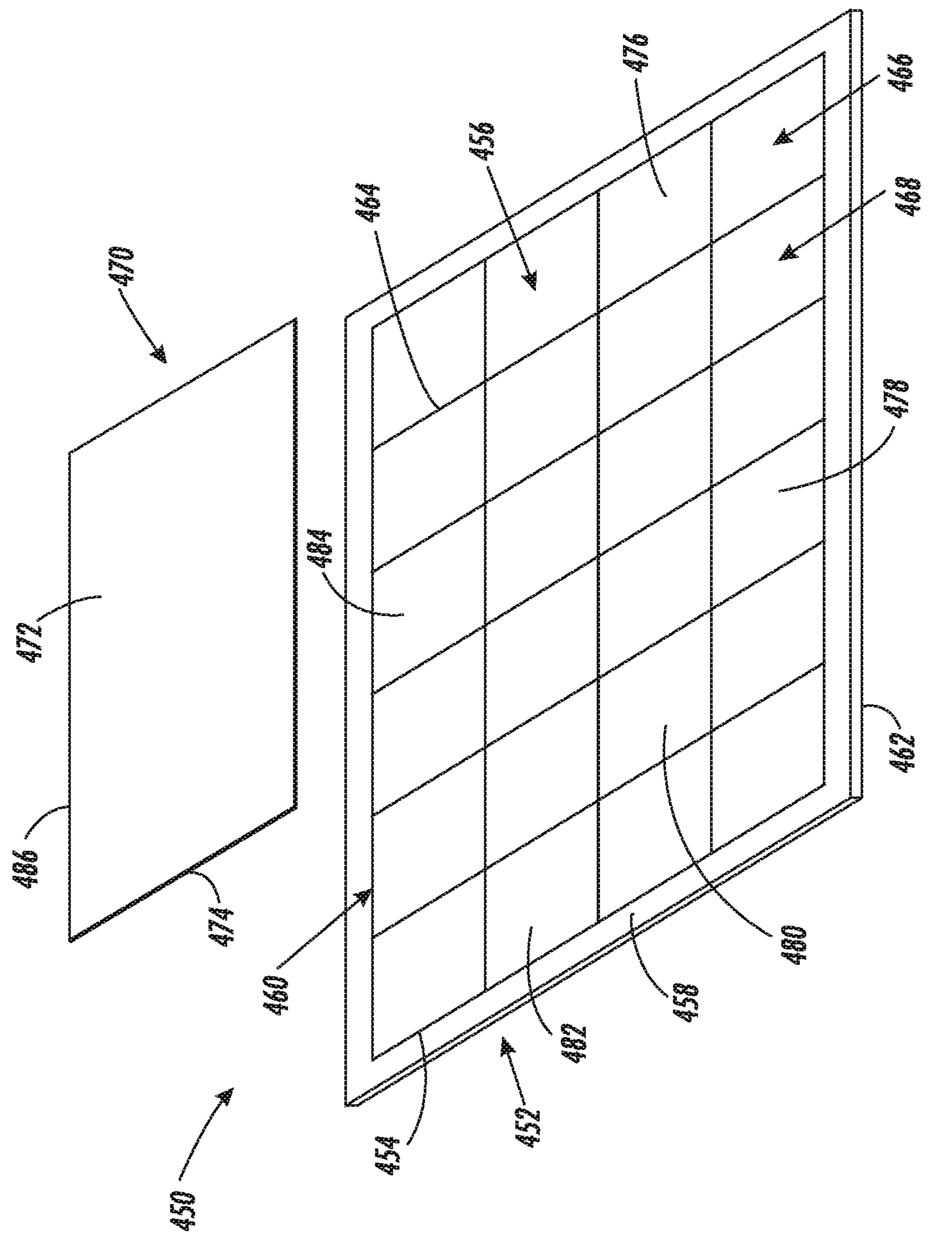
FIG. 35 is a perspective view of an embodiment of a carrier layer with a removable liner layer and a malleable material, e.g., fabric, separated therefrom.
Figure 36:
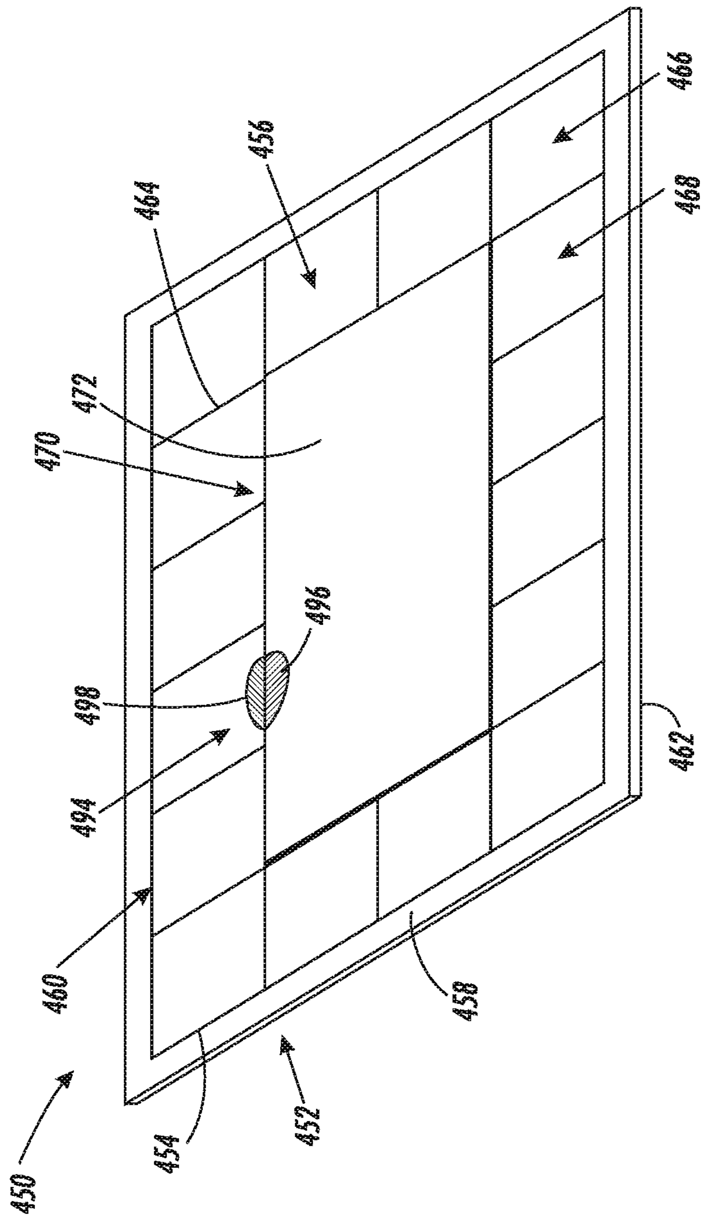
FIG. 36 is a perspective view of an embodiment of a carrier layer and a malleable material, e.g., fabric, releasably secured thereto via an adhesive after removal of a portion of a liner layer.
Figure 37:
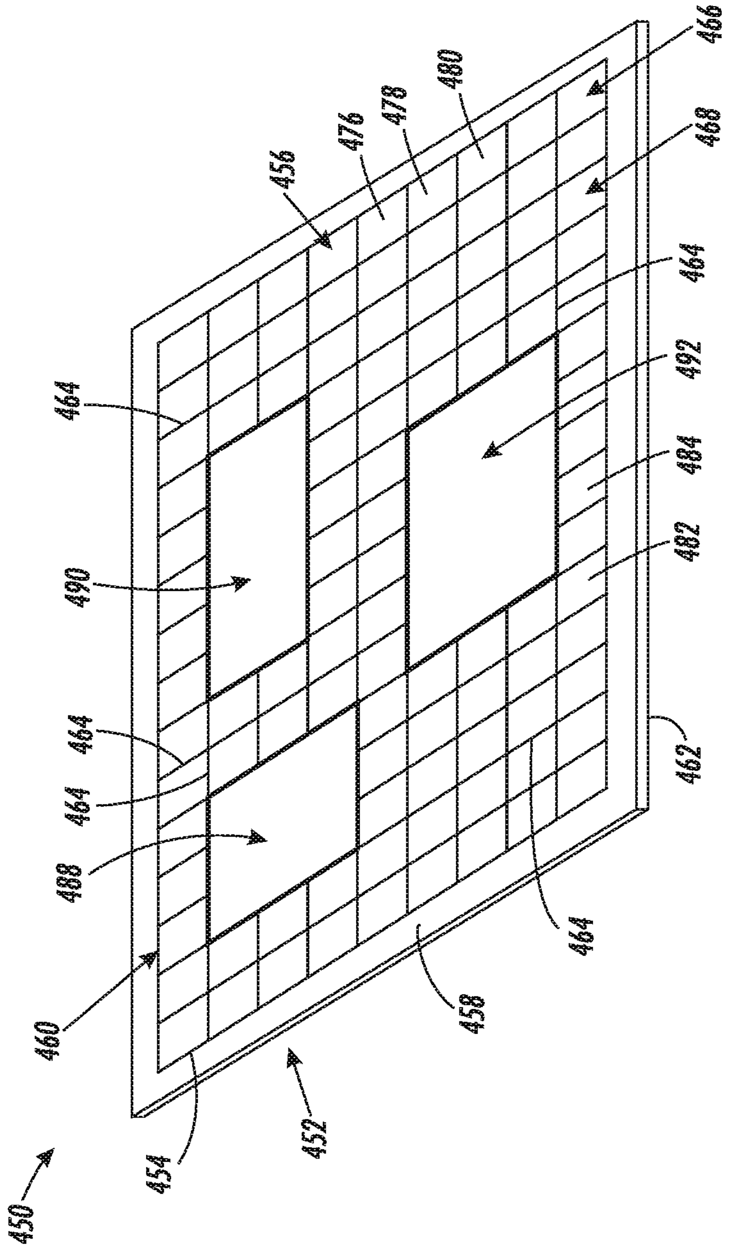
FIG. 37 is a perspective view of an embodiment of a carrier layer and a plurality of malleable materials, e.g., fabric, releasably secured thereto via an adhesive after removal of various portions of a liner layer.
Figure 38:
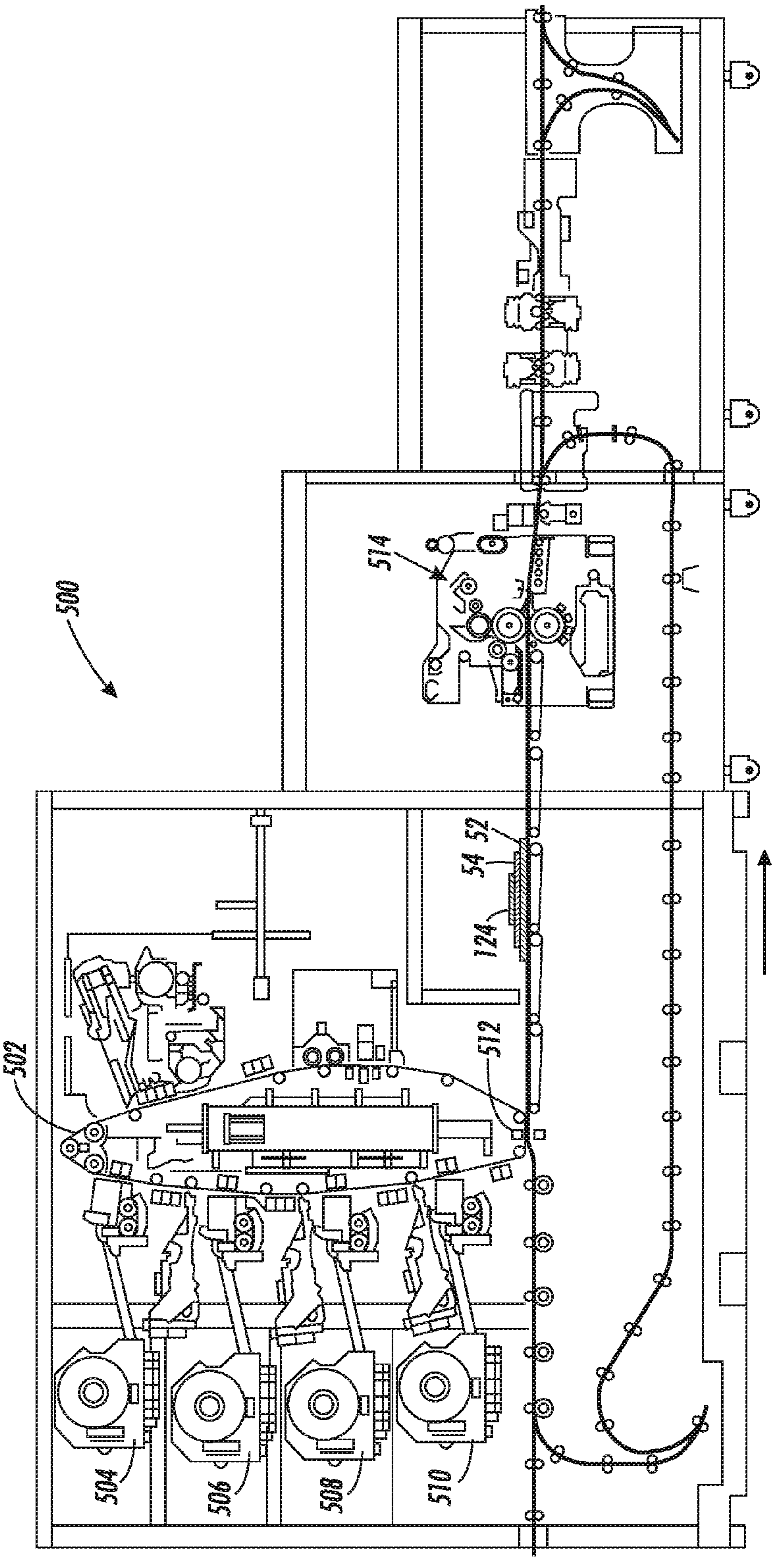
FIG. 38 is a side elevational view of an embodiment of a printing system having a single fuser and arranged to deposit dry marking material on a present printable media.
Figure 39:
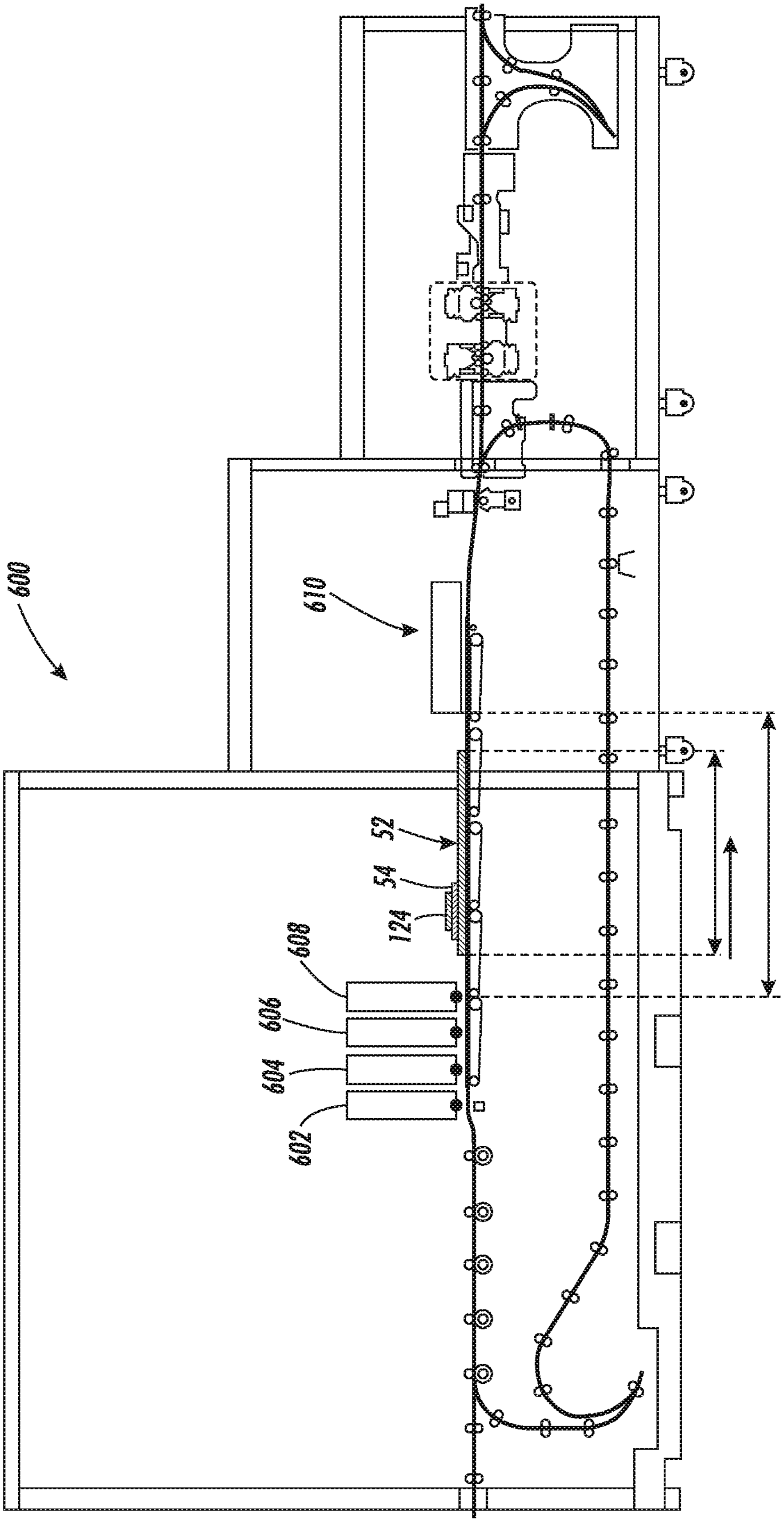
FIG. 39 is a side elevational view of an embodiment of a printing system having a single dryer and arranged to deposit liquid marking material on a present printable media.
Figure 40:
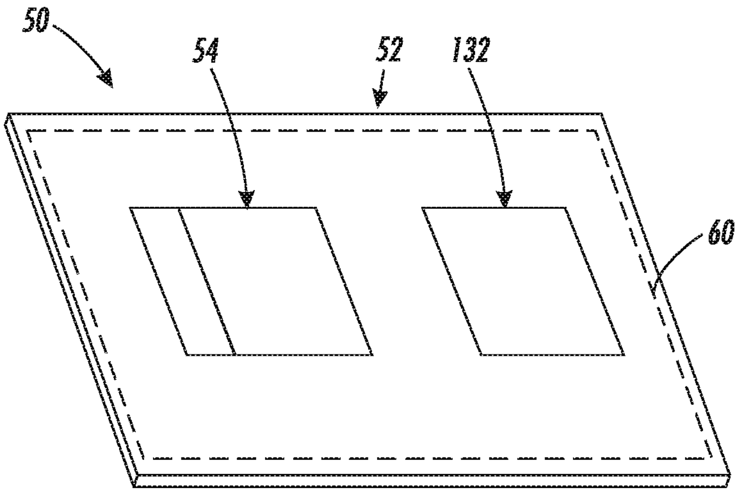
FIG. 40 is a perspective view of an embodiment of a carrier layer with an envelope and card releasably secured thereto via an adhesive.
Figure 41:
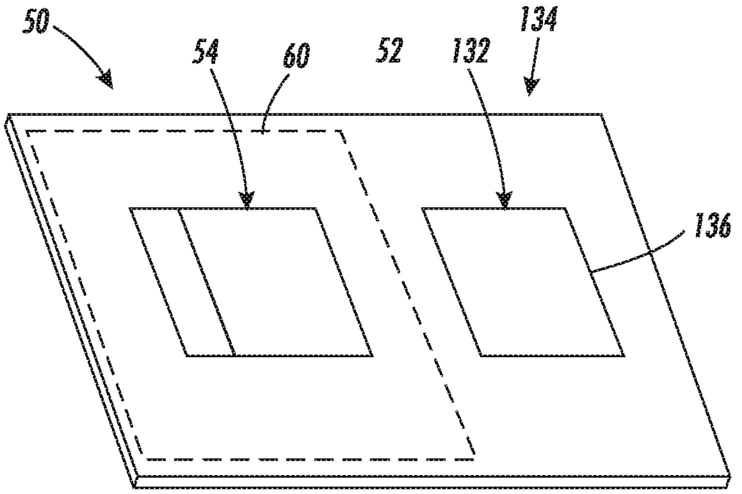
FIG. 41 is a perspective view of an embodiment of a carrier layer with an envelope releasably secured thereto via an adhesive and an integral card therein.
Figure 42:
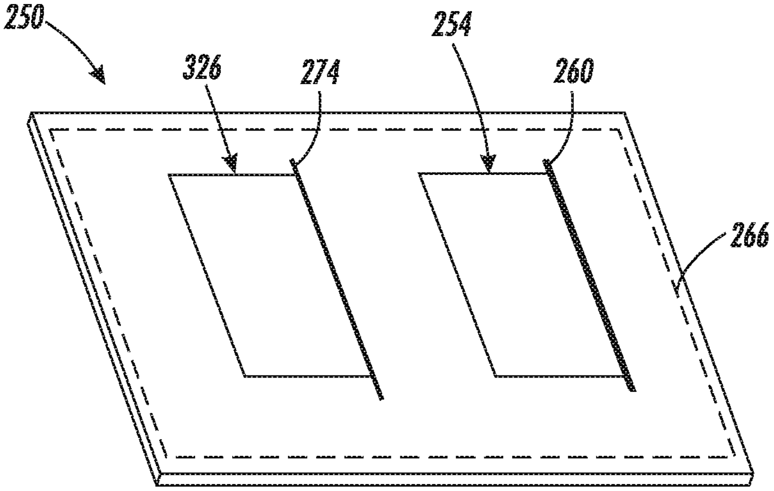
FIG. 42 is a perspective view of an embodiment of a carrier layer with an envelope and card releasably secured thereto via a slot in the carrier layer; and, FIG. 43 is a perspective view of an embodiment of a carrier layer with an envelope releasably secured thereto via a slot in the carrier layer and an integral card therein.
Figure 43:
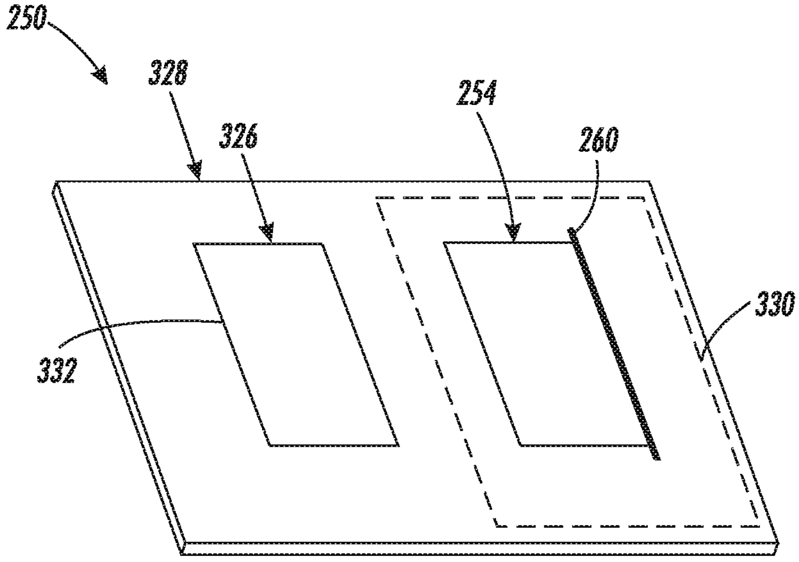

It should be appreciated that liner layer 456 may be formed from any number of sub-portions. For example, the embodiment depicted in FIG. 35 includes twenty-four (24) sub-portions, while the embodiment depicted in FIG. 37 includes one hundred thirty-five (135) sub-portions. Moreover, the shape of the sub-portions is dependent on the direction of score lines. Thus, sub-portions may be squares, rectangles, triangles, parallelograms, trapezoids, etc. Still further, separate groups of sub-portions may be removed whereby a plurality of malleable materials may be positioned about surface 458 of carrier layer 452. For example, as depicted in FIG. 37, three separate groups of sub-portions may be removed thereby permitting the releasable attachment of article 488, 490 and 492 simultaneously to carrier layer 452. As described above with respect to various other embodiments, articles attached to carrier layer 452 may be a variety of items, including but not limited to fabrics, tissue paper, envelopes, etc. Furthermore, the aforementioned sub-portions may be removed in different patterns in order to releasably secure an article to carrier layer 452. For example, a group of sub-portions corresponding to the edge of each article may be removed leaving the central portion of liner layer 456 intact, or alternatively, all sub-portions corresponding to the edge and central portion of each article may be removed. The foregoing selection may be determined based on the type of article being secured. For example, envelopes may be secured along the edges only, while a fabric material may be secured by removing the entire portion of liner layer 456 corresponding with the shape and size of the fabric material.

Still further, it should be appreciated that the foregoing embodiments permit full bleed printing on one or more envelopes, and/or one or more pieces of malleable materials. For example, liquid or dry marking material 494 may be deposited on printable media 450 whereby portion 496 of liquid or dry marking material 494 is deposited on malleable material 470 while portion 498 of liquid or dry marking material 494 is deposited on carrier layer 452. Upon removal of malleable material 470 from carrier layer 452, an image formed by liquid or dry marking material 494 appears printed in full bleed form.

Still yet further, it should be appreciated that the presently described print media may be used in a variety of printing systems. For example, printer 500 in part comprises transfer belt 502, dry marking material dispensers 504, 506, 508 and 510, acoustic transfer assist (ATA) device 512 and fuser 514, while printer 600 in part comprises liquid marking material dispensers 602, 604, 606 and 608 and dryer 610.

As described in the concurrently filed applications set forth in the Background section above, the distance between the location of final image formation, e.g., adjacent ATA 512 or adjacent liquid marking material dispenser 608, and the location of image fixing, e.g., fuser 514 or dryer 610, determines the length of printable media that may be used within a particular system. Thus, if ATA 512 is fifty-three (53) inches from fuser 514, then fifty-three (53) inch printable media may be used. Additionally, by arranging particular features on both sides of the carrier layer, e.g., printable media 450 may include adhesive and liner layers on both sides, the length of printable media may be doubled as extremely long lengths of media may be folded around the carrier layer thereby providing twice the printable length. In view of the foregoing, it should be appreciated that greater length print media permits larger and/or a greater number of envelopes, or malleable material, to pass through the printing system at one time.

Broadly, the present disclosure includes a variety of embodiments of methods of printing a full bleed envelope. In some embodiments, the method comprises: releasably securing a first envelope, e.g., envelope 54, to a carrier layer, e.g., carrier layer 52, with a first adhesive, e.g., adhesive 56, the carrier layer comprising a first surface, e.g., surface 58, comprising a first area, e.g., area 60, and a second surface opposite the first surface, e.g., surface 62, the first envelope comprising a third surface, e.g., surface 64, comprising a first edge, e.g., edge 130, a fourth surface opposite the third surface, e.g., surface 66, and a second area less than the first area, e.g., area 68, wherein the first envelope is releasably secured to the carrier layer by the first adhesive bonding the fourth surface to the first surface; applying a first dry marking material, e.g., dry marking material 124, immediately adjacent to the first edge of the third surface of the first envelope; and, fusing the first dry marking material to the first envelope with a fuser, e.g., fuser 514.

In some embodiments, the method of printing a full bleed envelope comprises: releasably securing a first envelope, e.g., envelope 54, to a carrier layer, e.g., carrier layer 52, with a first adhesive, e.g., adhesive 56, the carrier layer comprising a first surface, e.g., surface 58, comprising a first area, e.g., area 60, and a second surface opposite the first surface, e.g., surface 62, the first envelope comprising a third surface, e.g., surface 64, comprising a first edge, e.g., edge 130, a fourth surface opposite the third surface, e.g., surface 66, and a second area less than the first area, e.g., area 68, wherein the first envelope is releasably secured to the carrier layer by the first adhesive bonding the fourth surface to the first surface; applying a first liquid marking material, e.g., liquid marking material 124, immediately adjacent to the first edge of the third surface of the first envelope; and, drying the first liquid marking material to the first envelope with a dryer, e.g., dryer 610.

In some embodiments, the method of printing a full bleed envelope comprising: releasably securing a first envelope, e.g., envelope 254, to a carrier layer, e.g., carrier layer 252, with a first adhesive, e.g., adhesive 320, the carrier layer comprising a first surface, e.g., surface 256, a second surface opposite the first surface, e.g., surface 258, and a first slot, e.g., slot 260, the first envelope comprising a first closure, e.g., closure 262, a third surface, e.g., surface 324, comprising a first edge, e.g., edge 326, and a first area, e.g., area 264, wherein the first envelope is secured to the carrier layer by passing the first closure through the first slot such that the closure is adjacent the second surface, and the first area is less than a total area, e.g., area 266, of the first surface; applying a first dry marking material, e.g., dry marking material 314, immediately adjacent to the first edge of the third surface of the first envelope; and, fusing the first dry marking material to the first envelope with a fuser, e.g., fuser 514.

In some embodiments, the method of printing a full bleed envelope comprises: releasably securing a first envelope, e.g., envelope 254, to a carrier layer, e.g., carrier layer 252, with a first adhesive, e.g., adhesive 320, the carrier layer comprising a first surface, e.g., surface 256, a second surface opposite the first surface, e.g., surface 258, and a first slot, e.g., slot 260, the first envelope comprising a first closure, e.g., closure 262, a third surface, e.g., surface 324 comprising a first edge, e.g., edge 326, and a first area, e.g., area 264, wherein the first envelope is secured to the carrier layer by passing the first closure through the first slot such that the closure is adjacent the second surface, and the first area is less than a total area, e.g., area 266, of the first surface; applying a first liquid marking material, e.g., liquid marking material 314, immediately adjacent to the first edge of the third surface of the first envelope; and, drying the first liquid marking material to the first envelope with a dryer, e.g., dryer 610.

It should be appreciated that envelopes are configured in many different sizes and shapes. In some instances, it is desired to print envelopes full bleed in order to increase the impact provided when viewing those envelopes. Some envelopes, e.g., envelopes having less than ten (10) inches in one dimension, are difficult to pass through conventional printing systems while maintaining high image quality at high throughput speeds. The embodiments of print media and methods of using the same described above overcoming these shortcomings.

The present disclosure includes embodiments of devices and method for printing envelopes full bleed, i.e., forming an image entirely to at least one edge. Fuser/dryer arrangements described in concurrently filed applications permit printing on media lengths previously impossible, e.g., printing on fifty-three (53) inch long paper. The presently described devices and methods may benefit from the larger media options in that envelopes may be partially positioned in openings on carrier layers. Such carrier layers may be a large media format thereby permitting printing on a greater number of envelopes than previously possible. As described above, the carrier layer may include low tack adhesive liners. The envelopes may be positioned within opening towards the trailing edge to prevent IQ artifacts, e.g., from air bubbles being trapped within an envelope. Printing an image printed size slightly larger than the envelope size enables full bleed printing on the envelope. Above described acoustic transfer assist devices, if included, minimize effects of paper thickness differences due to envelope folds, e.g., dry marking material transfer efficiency. In other embodiments, e.g., using scored liners or liners with slots, an envelope flap can be arranged passing through a slot arranged directionally toward the lead edge of the carrier layer.

The present disclosure also includes embodiments of a universal liner used for printing on thin, flat, malleable materials, such as ready-made envelopes, fabric and other textiles. The present universal liner allows full printing to the sheet edge, also known as full bleed printing, and extends useful applications of many printing systems. The universal liner addresses problems described above, and provides a practical means to secure materials for printing that are not conventionally considered options.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A printing assembly received by and transported through a printer system, the printing assembly comprising:

a carrier assembly comprising an upper carrier assembly surface comprising a first area and a lower carrier assembly surface opposite the upper carrier assembly surface;

a first envelope comprising an upper envelope surface, a lower envelope surface opposite the upper envelope surface, a second area less than the first area, and a first envelope edge;

a first adhesive disposed between the upper carrier assembly surface and the lower envelope surface, the first adhesive releasably securing the lower envelope surface to the upper carrier assembly surface;

wherein at least one of a liquid printing ink or a dry toner is deposited on the upper envelope surface and the upper carrier assembly surface, the liquid printing ink or the dry toner deposited on the upper envelope surface forming a full bleed printed image that extends past at least one terminal edge of the upper envelope surface and to a portion of the upper carrier assembly surface such that the liquid printing ink or the dry toner deposited on the upper envelope surface is contiguous with the liquid printing ink or the dry toner deposited on the upper carrier assembly surface; and, wherein the full bleed printed image has been subjected to one or more of heat energy, non-heat energy, or pressure by the printer system.

2. The printing assembly of claim 1, wherein the first adhesive is disposed on a portion of the first area of the upper carrier assembly surface.

3. The printing assembly of claim 2, wherein the first area is less than or equal to a total area of the upper carrier assembly surface.

4. The printing assembly of claim 1, wherein the carrier assembly further comprises a third area on the lower carrier assembly surface, the first envelope comprises a first closure, the first adhesive is disposed on a portion of the first area, a second adhesive is disposed on a portion of the third area, and the first envelope is secured to the carrier assembly by the first adhesive releasably bonding the lower envelope surface to the upper carrier assembly surface and the second adhesive releasably bonding the first closure to the lower carrier assembly surface.

5. The printing assembly of claim 1, further comprising:

a second envelope comprising an upper envelope surface, a lower envelope surface opposite the upper envelope surface thereof, and a fourth area less than the first area;

wherein the second envelope is releasably secured to the carrier assembly by the first adhesive releasably bonding the lower surface of the second envelope to the upper carrier assembly surface; and, wherein at least one of a liquid printing ink or a dry toner is deposited on the upper envelope surface of the second envelope and the upper carrier assembly surface, the liquid printing ink or the dry toner deposited on the upper envelope surface of the second envelope forming a full bleed printed image that extends past at least one terminal edge of the upper envelope surface of the second envelope and to a portion of the upper carrier assembly surface such that the liquid printing ink or the dry toner deposited on the upper envelope surface of the second envelope is contiguous with the liquid printing ink or the dry toner deposited on the upper carrier assembly surface; and, wherein, the full bleed printed image of the second envelope has been subjected to one or more of heat energy, non-heat energy, or pressure by the printer system.

6. The printing assembly of claim 5, wherein a combination of the second area and the fourth area is less than the first area.

7. The printing assembly of claim 5, wherein the first envelope comprises the first edge, the second envelope comprises a second edge, and the first edge contacts the second edge.

8. The printing assembly of claim 5, wherein the first envelope comprises the first edge, the second envelope comprises a second edge, and the first edge is adjacent to and separated from the second edge.

9. The printing assembly of claim 5, further comprising:

a third envelope comprising an upper envelope surface, a lower envelope surface opposite thereto, and a fifth area less than the first area;

wherein the third envelope is releasably secured to the upper carrier assembly surface by the first adhesive releasably bonding the lower envelope surface of the third envelope to the first surface; and, wherein at least one of a liquid printing ink or a dry toner is deposited on the upper envelope surface of the third envelope and the upper carrier assembly surface, the liquid printing ink or the dry toner deposited on the upper envelope surface of the third envelope forming a full bleed printed image that extends past at least one terminal edge of the upper envelope surface of the third envelope and to a portion of the upper carrier assembly surface such that the liquid printing ink or the dry toner deposited on the upper envelope surface of the third envelope is contiguous with the liquid printing ink or the dry toner deposited on the upper carrier assembly surface; and wherein, the full bleed printed image of the third envelope has been subjected to one or more of heat energy, non-heat energy, or pressure by the printer system.

10. The printing assembly of claim 9, wherein a combination of the second area, the third area and the fifth area is less than the first area.

11. The printing assembly of claim 9, wherein the first envelope comprises the first edge, the second envelope comprises a second edge and a third edge, the third envelope comprises a fourth edge, the first edge contacts the second edge, and the third edge contacts the fourth edge.

12. The printing assembly of claim 9, wherein the first envelope comprises the first edge, the second envelope comprises a second edge and a third edge, the third envelope comprises a fourth edge, the first edge is adjacent to and separated from the second edge, and the third edge is adjacent to and separated from the fourth edge.

13. The printing assembly of claim 9, further comprising:

a fourth envelope comprising an upper envelope surface, a lower envelope surface opposite thereto, and a sixth area less than the first area;

wherein the fourth envelope is releasably secured to the carrier assembly by the first adhesive releasably bonding the lower envelope surface of the fourth envelope to the first surface; and, wherein at least one of a liquid printing ink or a dry toner is deposited on the upper envelope surface of the fourth envelope and the upper carrier assembly surface, the liquid printing ink or the dry toner deposited on the upper envelope surface of the fourth envelope forming a full bleed printed image that extends past at least one terminal edge of the upper envelope surface of the fourth envelope and to a portion of the upper carrier assembly surface such that the liquid printing ink or the dry toner deposited on the upper envelope surface of the fourth envelope is contiguous with the liquid printing ink or the dry toner deposited on the upper carrier assembly surface; and wherein, the full bleed printed image of the fourth envelope has been subjected to one or more of heat energy, non-heat energy, or pressure by the printer system.

14. The printing assembly of claim 13, wherein a combination of the second area, the fourth area, the fifth area, and the sixth area is less than the first area.

15. The printing assembly of claim 13, wherein the first envelope comprises the first edge, the second envelope comprises a second edge and a third edge, the third envelope comprises a fourth edge and a fifth edge, and the fourth envelope comprises a sixth edge, the first edge contacts the second edge, the third edge contacts the fourth edge, and the fifth edge contacts the sixth edge.

16. The printing assembly of claim 15, wherein the first envelope comprises a seventh edge and the fourth envelope comprises an eighth edge and the seventh edge contacts the eighth edge.

17. The printing assembly of claim 13, wherein the first envelope comprises the first edge, the second envelope comprises a second edge, a third edge, and a fourth edge, the third envelope comprises a fifth edge, and the fourth envelope comprises a sixth edge, the first edge contacts the second edge, the third edge contacts the fifth edge, and the fourth edge contacts the sixth edge.

18. The printing assembly of claim 13, wherein the first envelope comprises the first edge, the second envelope comprises a second edge and a third edge, the third envelope comprises a fourth edge and a fifth edge, and the fourth envelope comprises a sixth edge, the first edge is adjacent to and separated from the second edge, the third edge is adjacent to and separated from the fourth edge, and the fifth edge is adjacent to and separated from the sixth edge.

19. The printing assembly of claim 18, wherein the first envelope comprises a seventh edge and the fourth envelope comprises an eighth edge and the seventh edge is adjacent to and separated from the eighth edge.

20. The printing assembly of claim 13, wherein the first envelope comprises the first edge, the second envelope comprises a second edge, a third edge, and a fourth edge, the third envelope comprises a fifth edge, and the fourth envelope comprises a sixth edge, the first edge is adjacent to and separated from the second edge, the third edge is adjacent to and separated from the fifth edge, and the fourth edge is adjacent to and separated from the sixth edge.

21. The printing assembly of claim 1, wherein the carrier assembly comprises a lead edge and a trail edge, the first envelope comprises a first closure, and the first closure is directionally towards the trail edge.

22. The printing assembly of claim 1, wherein the carrier assembly further comprises an integrally formed card positioned outside of the first area.

23. The printing assembly of claim 1, further comprising:

a card secured to the carrier assembly by the first adhesive.

24. A printing assembly received by and transported through a printer system, the printing assembly comprising:

a carrier assembly comprising an upper carrier assembly surface, a lower carrier assembly surface opposite the upper carrier assembly surface, and a first slot; and, a first envelope comprising a first closure flap, a first area, and a first envelope edge;

wherein the first envelope is releasably secured to the carrier layer by passing the first closure flap through the first slot such that the first closure flap is adjacent the lower carrier assembly surface, and the first area is less than a total area of the upper carrier assembly surface; and, wherein at least one of a liquid printing ink or a the dry toner is deposited on an upper envelope surface of the first envelope and the upper carrier assembly surface, the liquid printing ink or the dry toner deposited on the upper envelope surface forming a full bleed printed image that extends past at least one terminal edge of the upper envelope surface and to a portion of the upper carrier assembly surface such that the liquid printing ink or the dry toner deposited on the upper envelope surface is contiguous with the liquid printing ink or the dry toner deposited on the upper carrier assembly surface; and wherein, the full bleed printed image has been subjected to one or more of heat energy, non-heat energy, or pressure by the printer system.

25. A printing assembly received by and transported through a printer system, the printing assembly comprising:

a carrier assembly comprising an upper carrier assembly surface comprising a first area and a lower carrier assembly surface opposite the upper carrier assembly surface;

a first envelope comprising an upper envelope surface, a lower envelope surface opposite the upper envelope surface, and a second area less than the first area;

a first adhesive disposed between the upper carrier assembly surface and the lower envelope surface, the first adhesive releasably securing the lower envelope surface to the upper carrier assembly surface;

a second envelope comprising an upper envelope surface, a lower envelope surface opposite the upper envelope surface, and a third area less than the first area, wherein the second envelope is releasably secured to the carrier layer by the first adhesive bonding the lower envelope surface thereof to the upper carrier assembly surface;

a third envelope comprising an upper envelope surface, a lower envelope surface opposite the upper envelope surface, and a fourth area less than the first area, wherein the third envelope is releasably secured to the carrier layer by the first adhesive bonding the lower envelope surface thereof to the upper carrier assembly surface; and, a fourth envelope comprising an upper envelope surface, a lower envelope surface opposite the upper envelope surface, and a fifth area less than the first area, wherein the fourth envelope is releasably secured to the carrier layer by the first adhesive bonding the lower envelope surface thereof to the upper carrier assembly surface;

wherein the first envelope comprises a first edge, the second envelope comprises a second edge, a third edge, and a fourth edge, the third envelope comprises a fifth edge, and the fourth envelope comprises a sixth edge, the first edge contacts the second edge, the third edge contacts the fifth edge, and the fourth edge contacts the sixth edge; and wherein at least one of a liquid printing ink or a dry toner is deposited on the upper envelope surface of the first envelope and the upper carrier assembly surface, the liquid printing ink or the dry toner deposited on the upper envelope surface of the first envelope forming a full bleed printed image that extends past at least one terminal edge of the upper envelope surface of the first envelope and to a portion of the upper carrier assembly surface such that the liquid printing ink or the dry toner deposited on the upper envelope surface of the first envelope is contiguous with the liquid printing ink or the dry toner deposited on the upper carrier assembly surface; and, wherein, the full bleed printed image has been subjected to one or more of heat energy, non-heat energy, or pressure by the printer system.

26. A printing assembly received by and transported through a printer system, the printing assembly comprising:

a carrier assembly comprising an upper carrier assembly surface comprising a first area and a second lower carrier assembly surface opposite the upper carrier assembly surface, and an integrally formed card positioned outside of the first area;

a first envelope comprising an upper envelope surface, a lower envelope surface opposite the upper envelope surface, a second area less than the first area, and a first envelope edge; and, a first adhesive disposed between the upper carrier assembly surface and the lower envelope surface, the first adhesive releasably securing the lower envelope surface to the upper carrier assembly surface;

wherein the first envelope is secured to the carrier layer by the first adhesive bonding the lower envelope surface to the upper carrier assembly surface and the first envelope is spaced apart from the integrally formed card; and, wherein at least one of a liquid printing ink or a dry toner is deposited on the upper envelope surface of the first envelope and the upper carrier assembly surface, the liquid printing ink or the dry toner deposited on the upper envelope surface of the first envelope forming a full bleed printed image that extends past at least one terminal edge of the upper envelope surface of the first envelope and to a portion of the upper carrier assembly surface such that the liquid printing ink or the dry toner deposited on the upper envelope surface of the first envelope is contiguous with the liquid printing ink or the dry toner deposited on the upper carrier assembly surface; and, wherein the full bleed printed image has been subjected to one or more of heat energy, non-heat energy, or pressure by the printer system.

27. A printing assembly received by and transported through a printer system, the printing assembly comprising:

a carrier assembly comprising an upper carrier assembly surface comprising a first area and a lower carrier assembly surface opposite the upper carrier assembly surface;

a first envelope comprising an upper envelope surface, a lower envelope surface opposite the upper envelope surface, a second area less than the first area, and a first envelope edge;

a first adhesive disposed between the upper carrier assembly surface and the lower envelope surface, the first adhesive releasably securing the lower envelope surface to the upper carrier assembly surface; and, a card releasably secured to the upper carrier assembly surface by the first adhesive, the card being spaced apart from the first envelope;

wherein at least one of a liquid printing ink or a dry toner is deposited on the upper envelope surface of the first envelope and the upper carrier assembly surface, the liquid printing ink or the dry toner deposited on the upper envelope surface of the first envelope forming a full bleed printed image that extends past at least one terminal edge of the upper envelope surface of the first envelope and to a portion of the upper carrier assembly surface such that the liquid printing ink or the dry toner deposited on the upper envelope surface of the first envelope is contiguous with the liquid printing ink or the dry toner deposited on the upper carrier assembly surface; and, wherein, the full bleed printed image has been subjected to one or more of heat energy, non-heat energy, or pressure by the printer system.

* * * * *